(12) United States Patent
Joseph et al.

(10) Patent No.: US 10,739,613 B2
(45) Date of Patent: *Aug. 11, 2020

(54) RETROREFLECTOR DISPLAY SYSTEM FOR GENERATING FLOATING IMAGE EFFECTS

(71) Applicant: DISNEY ENTERPRISES, INC., Burbank, CA (US)

(72) Inventors: Daniel M. Joseph, Los Angeles, CA (US); Lanny S. Smoot, Thousand Oaks, CA (US); Quinn Y. Smithwick, Pasadena, CA (US); Michael J. Ilardi, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/979,616

(22) Filed: May 15, 2018

(65) Prior Publication Data

US 2018/0259784 A1    Sep. 13, 2018

Related U.S. Application Data

(63) Continuation of application No. 15/218,377, filed on Jul. 25, 2016, now Pat. No. 10,001,654.

(51) Int. Cl.
*G02B 30/56* (2020.01)
*G02B 3/00* (2006.01)
(Continued)

(52) U.S. Cl.
CPC ........... *G02B 30/56* (2020.01); *G02B 3/0043* (2013.01); *G02B 3/0056* (2013.01); *G02B 3/14* (2013.01);
(Continued)

(58) Field of Classification Search
CPC ............. G02B 27/2292; G02B 3/0043; G02B 3/0056; G02B 3/14; G02B 5/124; G02B 5/3083; G02B 27/14
(Continued)

(56) References Cited

U.S. PATENT DOCUMENTS

| 6,232,938 B1 * | 5/2001 | Tsuchida | ............... G09G 3/3648 |
| | | | 345/103 |
| 7,394,506 B2 * | 7/2008 | Cirkel | .................... G02B 30/25 |
| | | | 349/15 |

(Continued)

*Primary Examiner* — James R Greece
(74) *Attorney, Agent, or Firm* — Snell & Wilmer LLP; Kent A. Lembke

(57) ABSTRACT

A display system is provided that combines the use of a display element with a beamsplitter and at least one retroreflector to provide an image (2D or 3D depending upon the output image from the display element) that appears to be floating in space some distance from the beamsplitter. For example, light that is bounced off/reflected and/or that is transmitted through the beamsplitter may be reflected from the reflective surface of the retroreflector toward the beamsplitter. The beamsplitter directs this light, through reflection or transmission, into a viewing space such that the 2D or 3D image can be viewed by a viewer as it appears to float a distance from the nearest surface of the beamsplitter and, typically, some distance above the ground/floor upon which viewers are walking. The floating image may be relatively bright so that it is viewable in low and brighter light conditions.

30 Claims, 23 Drawing Sheets

(51) Int. Cl.
*G02B 27/14* (2006.01)
*G02B 5/124* (2006.01)
*G02B 5/30* (2006.01)
*G02B 3/14* (2006.01)
*G02B 30/00* (2020.01)
*G02B 30/40* (2020.01)
*G02B 27/28* (2006.01)

(52) U.S. Cl.
CPC .......... *G02B 5/124* (2013.01); *G02B 5/3083* (2013.01); *G02B 27/14* (2013.01); *G02B 30/00* (2020.01); *G02B 30/40* (2020.01); *G02B 27/283* (2013.01)

(58) Field of Classification Search
USPC .................................................. 359/629–630
See application file for complete search history.

(56) References Cited

U.S. PATENT DOCUMENTS

| | | | |
|---|---|---|---|
| 8,525,829 B2 | 9/2013 | Smithwick et al. | |
| 8,646,917 B2 | 2/2014 | Reichow et al. | |
| 8,692,738 B2 | 4/2014 | Smithwick et al. | |
| 8,711,061 B2 | 4/2014 | Reichow et al. | |
| 8,749,621 B2 | 6/2014 | Joseph et al. | |
| 9,158,189 B2 | 10/2015 | Joseph | |
| 9,182,524 B2 | 11/2015 | Smithwick et al. | |
| 9,212,805 B2 | 12/2015 | Reetz et al. | |
| 9,219,910 B2 | 12/2015 | Reichow et al. | |
| 2010/0177382 A1* | 7/2010 | De La Barre | G03B 35/24 359/463 |
| 2011/0310121 A1* | 12/2011 | Baron | H04N 13/395 345/634 |
| 2012/0057006 A1 | 3/2012 | Joseph et al. | |
| 2013/0106923 A1* | 5/2013 | Shields | G09G 3/3406 345/690 |
| 2013/0300728 A1* | 11/2013 | Reichow | G09G 3/003 345/419 |
| 2014/0192281 A1* | 7/2014 | Smithwick | H04N 13/395 349/15 |
| 2014/0347361 A1* | 11/2014 | Alpaslan | G06T 15/50 345/426 |
| 2015/0109522 A1* | 4/2015 | Kimura | H04N 5/2352 348/362 |
| 2016/0195849 A1* | 7/2016 | Takagi | G06F 3/017 348/40 |
| 2016/0284121 A1* | 9/2016 | Azuma | H04N 13/388 |

* cited by examiner

RETROREFLECTOR DISPLAY SYSTEM FOR GENERATING FLOATING IMAGE EFFECTS

CROSS REFERENCE TO RELATED APPLICATIONS

This application is a continuation of U.S. patent application Ser. No. 15/218,377, filed Jul. 25, 2016, which is incorporated herein by reference in its entirety.

BACKGROUND

1. Field of the Description

The present description relates, in general, to displays adapted to provide the illusion that a virtual or projected image is a three-dimensional (3D) image or has volume or a two-dimensional (2D) or 3D image is floating in space like a hologram from a futuristic movie. More particularly, the description relates to systems and methods for producing 2D or 3D images that appear to float in space using one or more retroreflectors or sheets of retroreflective material (also called retroreflective elements/devices, retro reflective material/sheets, and retro-reflective material/sheets within the industry).

2. Relevant Background

Today, there is a growing demand for displays with exciting and eye-catching visual effects. For example, there is a growing trend toward using 3D projection techniques in theatres and amusement parks and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. However, stereoscopy, stereoscopic imaging, 3D imaging, and 3D or volumetric displays are labels for any technique capable of creating the illusion of depth in an image.

Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery and volumetric displays are exciting ways to appeal to viewers and hold their attention. However, the use of 3D imagery has, in the past, been limited by a number of issues. Typically, 3D projection technologies require the viewer to wear special viewing glasses. This is often inconvenient for many applications and can significantly add to costs to provide the 3D media for projection and also for the special eyewear that has to be provided to the viewer.

Some attempts have been made in providing volumetric displays without the need for eyewear, but each has its own limitations. For example, displays providing a scrim projection or traditional Pepper's Ghost illusion are common tools used throughout amusement parks and other settings. These displays allow placement of a virtual character or object (i.e., a ghost, a video of a character, or the like) within a real world scene. A scrim projection is usually accomplished by using a projection onto a scrim (e.g., an open weave material appearing transparent when lit from behind but providing a projection surface when lit from the front or viewer's side) while a Pepper's Ghost is a reflection of a display in a beam splitter. Unlike directly viewing an opaque monitor, the scrim and the beam splitter are partially transparent to the viewer (even when lit from the front) so the displayed character is not framed by the display. The virtual character can be placed relatively seamlessly behind real world objects or props (foreground elements) and in front of real world objects or props (background surfaces and elements). Unfortunately, the partial transparency of the scrim or the beam splitter also leads to the virtual character having low contrast and being semi-transparent, and the images produced are often relatively small in size.

Hence, there remains a need for a display system that is adapted to produce 2D and/or 3D images (without the need for viewers to wear special eyewear) that appear to float in that it is not projected upon a projection screen or other surface. For example, the floating image may be in a space in which viewers may be present such that the viewers can be near to the image and can, in some cases, walk about and interact with the floating image. Preferably, the display system would be configured to produce a floating image that can be large in scale and, in many applications, be visible to the viewer not only in dark rooms or spaces but also in more highly illuminated rooms or spaces (e.g., a 3D image may float in an outside space near a queue for a ride or attraction at an amusement or theme park or in a lobby of a movie theater).

SUMMARY

To address the above problems and ongoing needs, a display system is provided that combines the use of a display element with a beamsplitter and at least one retroreflector to provide an image (2D or 3D depending upon the output image from the display element) that appears to be floating in space some distance from the beamsplitter. For example, light that is bounced off/reflected and/or that is transmitted through the beamsplitter may be reflected from the reflective surface of the retroreflector toward the beamsplitter. The beamsplitter directs this light (through reflection and/or transmission) into a viewing space such that the 2D or 3D image can be viewed by a viewer as it appears to float a distance from the nearest surface of the beamsplitter (and, typically, some distance above the ground/floor upon which viewers are walking).

The floating image can be produced to be relatively bright so that it is viewable in low and brighter light conditions. The display system is also advantageous as it is solid state with no moving parts and because it is easy to implement and scale from a smaller image to a relatively large one (e.g., from a floating image with a height of several inches to several, or even, many feet). The cost to implement the display system is also relatively low, and it can be packaged in a relatively small space with easy access for engineering and maintenance.

More particularly, an apparatus or display system is provided that is adapted for generating floating images. The apparatus includes a display element displaying an image with first light from a display surface. Significantly, the apparatus also includes a retroreflector with a reflective surface facing the display surface, with the reflective surface being formed with or of a retroreflective material. The apparatus further includes a beamsplitter disposed between the display element and the retroreflector with a first surface facing the display surface to receive the first light. During operations of the apparatus, the beamsplitter transmits a portion of the received first light as second light toward the reflective surface of the retroreflector, the reflective surface reflects the second light as third light toward a second surface of the beamsplitter that is opposite the first surface, and the beamsplitter reflects a portion of the third light as fourth light into a display space to provide a displayed image at a distance from the second surface of the beamsplitter.

In exemplary embodiments, the reflective surface and the display surface are planar surfaces, with the reflective surface being parallel to the display surface. The first surface of the beamsplitter typically is oriented to extend at a non-zero angle relative to the display surface (e.g., to not be parallel such as at a 45 degree angle). The displayed image is a real image provided at a convergence or display plane located a distance from the second surface of the beamsplitter that matches the separation between the beamsplitter and the display element. In some preferred embodiments, the display element comprises a monitor with an output luminence of at least 2500 Nits. For example, the display element may take the form of a liquid crystal display (LCD) monitor. In other embodiments, though, the display element is a monitor or multi-level display assembly, and the image from the display element is a three-dimensional (3D) image.

The apparatus may further include a second retroreflector positioned with a reflective surface including retroreflective material facing the first surface of the beamsplitter and oriented to be orthogonal to the reflective surface of the retroreflector. In such embodiments, the apparatus may also include a lens element (such as a sheet of transparent material with an array of microlenses on a surface facing the beamsplitter) disposed between the reflective surface of the second retroreflector and the first surface of the beamsplitter, and the lens element can be positioned a distance from the reflective surface of the second retroreflector that is equal to a focal distance of one or more lenses of the lens element.

Still further, the apparatus may include a scrim positioned between the second surface of the beamsplitter and the display space. The apparatus may also include a prop or object in the display space with a surface below, above, or to the side of the displayed image. In such implementations, at least a portion of the surface of the prop is located at a separation distance from the second surface of the beamsplitter that equals the distance between the displayed image and the second surface of the beamsplitter.

In some single retroreflector embodiments, the first light from the display element has a first polarization. The beamsplitter may be polarized to be transmissive to light having the first polarization and to block or reflect light with other polarizations (e.g., to light having a polarization differing from the first polarization). The apparatus may further include a waveplate (e.g., a quarter waveplate) between the second surface of the beamsplitter and the reflective surface of the retroreflector. During apparatus operations, the second light may have a second polarization and the third light may have a third polarization after passing through the waveplate such that the third polarization differs from the first polarization as is reflected.

DETAILED DESCRIPTION

Figure 1:
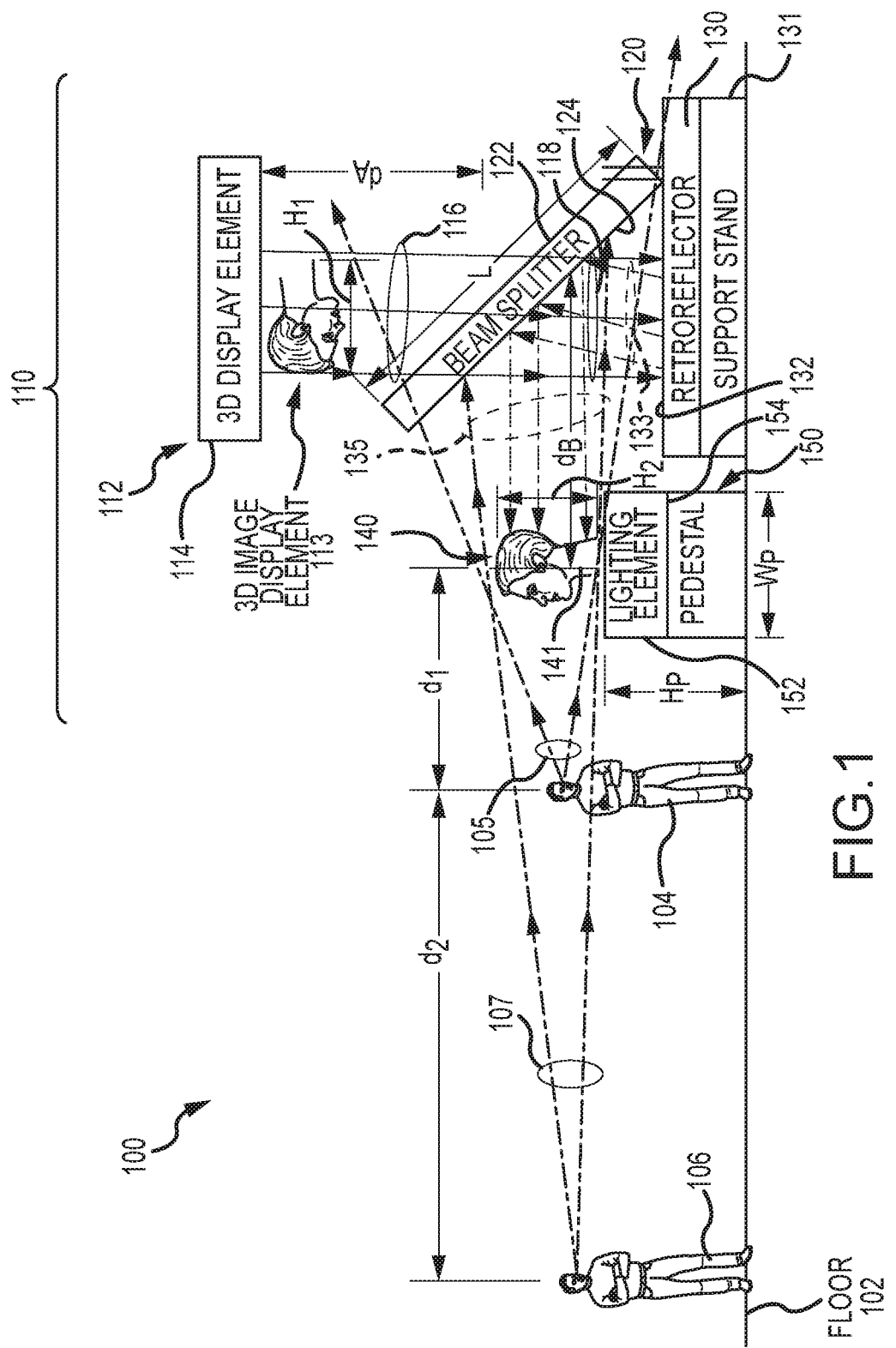
FIG. 1 is a side, schematic view of a display environment or space in which a display system or apparatus of the present description is operating to display a floating 3D image to two (or more) viewers (who do not need to wear special eyewear)

Briefly, a display system is described that is specially configured to produce a clear and relatively large (or scalable from small to large sizes of inches to several or many feet) floating image. The floating image may be 2D or 3D and may be presented in still or video format in space or near to a display pedestal or a prop provided in the viewing area. Examples of uses of such floating images or hologram-like effects include a floating talking head, a floating control panel, moving 2D or 3D stream of light extending from a futuristic weapon, and so on. The viewer may be able to walk near to and even around, in some cases, the displayed image, and some embodiments provide the viewer with interaction options that can cause the image to change based on the interaction data (e.g., did the user select an item on a control panel, did the user "move" a 3D game piece relative to a pedestal game or prop game surface, and the like).

Prior to turning to the supporting figures and exemplary implementations of display systems, it may be useful to first discuss a display system discovered by the inventors as part of prototyping a display to provide a floating image concurrently viewable by a plurality of viewers in a view space without the need for special eyewear. The prototyped display system included a large beamsplitter (e.g., a square or rectangular plastic or glass beamsplitter that was 150 centimeters on a side). A similarly large (e.g., somewhat smaller in dimensions than the beamsplitter) display element was provided in the form of a liquid crystal display (LCD) television (TV), and the display element was operated to display 2D and 3D images. The longitudinal axes of the beamsplitter and the display element were parallel, but the surface of the beamsplitter proximate to and facing the display element was at an angle (45 degrees, for example) to the display element's front surface.

The display element was positioned above the beamsplitter (e.g., with the display element's front or display surface parallel to the floor or viewing space platform), but other prototypes were envisioned in which the beamsplitter and display element would be vertically oriented with the display element off to the side of the beamsplitter (e.g., with an arrangement similar to many conventional Pepper's Ghost displays). The light associated with these displayed images was directed from the display element's front surface (e.g., a monitor screen) toward the beamsplitter where a fraction is passed (e.g., the beamsplitter is transmissive to the light but about 50 percent of the brightness is lost at each splitting) on to a reflective element or reflector.

The reflective element was positioned directly below and with its reflective surface facing and parallel to the display element's front or display surface. Significantly, the reflective element took the form of a retroreflector or sheet of retroreflective material with its reflective surface facing the beamsplitter and display element. The light that was passed through the beamsplitter is reflected back towards the beamsplitter with a minimum of scattering. A fraction (e.g., 50 percent) of the light from the retroreflector is reflected off the beamsplitter's lower surface (or second surface facing the retroreflector) and out into a viewing space to provide a displayed or floating image. The displayed/floating image is at a distance that matches the distance from the beamsplitter and the display element's display/front surface and is a real image. The displayed or floating image was perceived or viewed differently by the left and right eye of the viewer (who was not wearing special eyewear), and appears to be floating due to the use of the beamsplitter rather than originating at a display device's surface.

In the prototype, context for this floating image was provided to the viewer by positioning a pedestal or other prop below the floating or displayed image such that it appeared to float directly above the top surface of this pedestal/prop. A light source was provided on the top of the pedestal so that this light source appeared to be the source of the displayed, floating image (e.g., a hologram effect was produced by the prototyped display system). A scrim was also placed in front of the assembly between the viewer and the beamsplitter to allow a large percentage of the light from the beamsplitter to reach the viewing area and the display plane/focal plane but to disguise the source (e.g., to provide the appearance of an opaque wall).

The distance between the beamsplitter and the front surface of the display element defines how far from the lower or second surface of the beamsplitter and a scrim (the disguising wall) the image will be displayed in the viewing space. In one prototype the distance from the center of the display element's surface to about the center of the top or first surface of the beamsplitter was in the range of 5 to 10 feet such that the image appeared to float a relatively large distance off of or in front of the scrim/disguising wall (e.g., about 7 feet).

FIG. 1 is a side, schematic view of a display environment or space 100 in which a display system or apparatus 110 of the present description is operating to display a floating 3D image 140 to two (or more) viewers 104, 106 (who do not need to wear special eyewear). The first viewer 104 may be relative close (e.g., $d_1$ is 0 to several feet) to the displayed floating image 140, which is displayed relatively to a focal or display plane (or plane of convergence as the image 140 is a real image) 141, while the second viewer 106 may be relatively far away (e.g., $d_2$ is 5 to 30 feet or more). The light traveling to or viewed by the viewers 104, 106 are shown by arrows 105 and 107, respectively (or these arrows 105 and 107 may be considered as defining the viewing angle of the viewers 104 and 106).

The floating image 140 is shown to be displayed over a top surface 152 of a prop in the form of a pedestal or table 150, with a width, $W_P$, that may be chosen to match a depth or width of the image 140 (when the image 140 is a 3D image) such as several inches to several feet or be somewhat smaller or larger and with a height, $H_P$, that is chosen to place the surface 152 at or just below a lower end or portion of the displayed image 140. The pedestal 150 provides the viewers 104, 106 with context or an anchor for perceiving the floating image 140 with more comfort or with less eye strain that may occur when a floating image is provided in a disconnected manner in space.

Further, the image 140 may be caused to appear to have its source at the pedestal surface 152 by providing a lighting element or source 154 on or near the surface 152 such that the image 140 appears to be a hologram originating from the lighting element 154. In other embodiments, the prop 150 may take other forms and the floating image 140 may be provided to emanate from and retract into one or more surfaces of the prop to achieve a desired visual effect. For example, the prop 150 may be a robot, a human actor, a futuristic character/statue, or the like and 2D or 3D images 140 may be selectively displayed from one or more surfaces of such props (e.g., a light saber or light streak may appear from a prop's surface, a ghostly aura may be shown behind the prop, and so on as the use of floating images 140 is nearly limitless and only limited by a designer of a display space 100 and display system 110).

The display system 110 is desirable for such display or viewing spaces 100 as the displayed image 140 can be provided to be relatively bright so viewable in dark and also higher lighting settings (e.g., the space 100 may be a lighted indoor space or even be outdoors with sunlight present). The display system 110 is also able to provide a relatively large image 140 with its height, $H_2$, ranging from several inched to several feet with its size limited mainly by the size of the imagery output from a display element 112 (which may be quite large depending upon which technology is used to provide a 2D, 3D, or multi-layer image 113).

To produce the image 140 (3D in this example), the display system 110 includes a 3D display element 112 with an outer display surface 114, and display element 112 is operated to display a 3D image 113 on this display surface 114 (or at the surface 114). For example, the display element 112 may be an LCD or similar display device operable to provide a 3D image 113 on its display surface 114. This may be a high brightness image 113 such as by selecting the LCD or other display device to be daylight-viewable (e.g., a device with luminance of 1500 to 2500 Nits or high levels of illuminance). Such high levels of luminance are desirable for the display element 112 due to the losses in the display system 110 such as at the beamsplitter 120 and because it is preferred that the displayed, floating image 140 be sharp and bright and be viewable in higher light spaces 100 by viewers 104, 106. In other embodiments, a 3D image 113 is created through the use of a multiplane display element 112, which also may be designed to provide the image 113 with high brightness (higher luminance such as 2500 Nits or the like).

The outer display surface 114 is shown to be arranged to be facing downward (e.g., the planar surface 114 is parallel to the floor/ground 102 of the space 100) to project or display the image 113 downward as shown by arrows 116 (representing light emitted or projected from display element 112). In other embodiments, the surface 114 may be oriented differently such as to be vertical. The image 113 on display surface 114 (or from display element 112) has a size as shown by height, $H_1$, and the display system 110 is adapted such that the floating, displayed image 140 is a real image at display or focal plane 141 with a size matching that of the image 113, i.e., height, $H_1$, is equal to height, $H_2$, of the image 140.

The display system 110 further includes a beamsplitter 120. The size of the floating image 140 matches that of output image 113 from display element 112 by having the distance, $d_A$, from the upper or first surface 122 of the beamsplitter 120 to the display screen/surface 114 matching the distance, $d_B$, from the lower or second surface 124 of the beamsplitter to the image display or focal plane 141. The beamsplitter 120 is chosen to be large enough (e.g., with an adequately large length, L, that is greater than a width of the display surface 114 or at least greater than the height, $H_1$, of the image 113) such that when it is arranged at an angle (e.g., 45 degrees as shown) to the display surface 114 it can receive all (or most) of the light 116 associated with the image 113. The beamsplitter 120 is transmissive to the light 116 (as well as reflecting a portion off of the upper or first surface 122 away from the viewers 104, 106 and pedestal 150), and, as a result, light 118 associated with the image 113 passes through the beamsplitter 120.

Significantly, the display system 110 also includes a retroreflector (or retroreflective element) 130 positioned with its reflective surface 132 facing the second or lower surface 124 of the beamsplitter 120 (and the display element 112). In the illustrated embodiment, the retroreflector 130 is mounted on a support stand or frame 131 so as to be planar and parallel to the display element surface 114 (as well as the floor 102), which results in the reflective surface 132 being at an angle (such as 45 degrees) relative to the beamsplitter surface 124. The reflected light 133 from the retroreflector 130 strikes the lower or second surface 124 of the beamsplitter 120. A portion is reflected as shown with arrows 135 while another portion is transmitted through the beamsplitter 120 (not shown in FIG. 1). The light 135 acts to create or produce the displayed, floating image 140, which in this example is a 3D image (still or video).

The retroreflector 130 may take many forms to practice the display system 110 such as a sheet of retroreflective material (e.g., with a 60-degree acceptance angle or the like) that is configured to reflect light 113 back toward its source (e.g., the display element 112) with a minimum of scattering as shown with arrows 133 (e.g., reflected back along a vector that is parallel to but opposite in direction from the source light 118). The reflective surface 132 may include numerous corner reflectors, Cat's eye reflectors, phase-conjugate mirrors, or the like as found in conventional retroreflective material/sheets.

Figure 2:
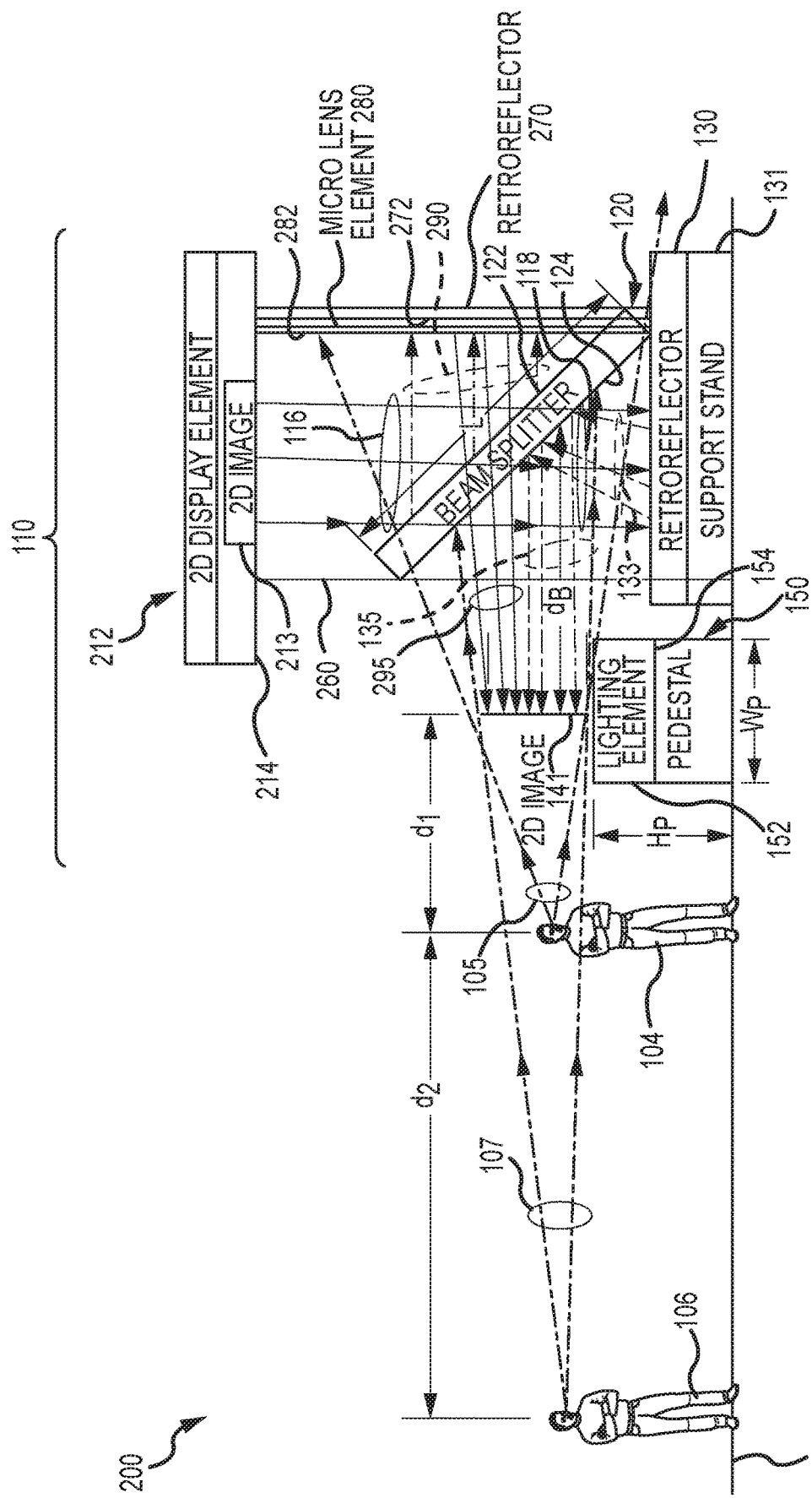
FIG. 2 is a side, schematic view of a display environment similar to that shown in FIG. 1 but including another example of a display system or apparatus of the present description.

FIG. 1 illustrated use of a single retroreflector in combination with a beamsplitter and a 3D display element to provide a 3D displayed image. In other embodiments, it may be useful to add or change one or more of the components of the display system 100. For example, FIG. 2 illustrates another display space or environment 200 with a second embodiment of a display system 210. The display system 210 includes several of the components of the system 110, including the beamsplitter 120 and the first retroreflector 130, and these are labeled with the same reference numbers as in FIG. 1 and not described in as much detail with reference to FIG. 2.

The display system 210 differs from system 110 in that it includes a 2D display element (such as a high luminance LCD or other monitor) 212 operating to display a 2D image (still or video) 213 on its display screen/surface 214. The display system 210 is configured to provide a floating, real image 240 on the convergence plane 241 (the image and plane coincide in this case). Note, in display system 110, the display element 112 may be replaced with display element 212 and, likewise, the display element 212 may be replaced in system 210 with the 3D display element 112. To this end, the system 210 (as with system 110) includes a beamsplitter 120 and a first retroreflector 130 positioned on an opposite side of the beamsplitter 120 to face the display element 212 to reflect the light 118 transmitted through the beamsplitter 120 back toward the lower or second surface 124 of the beamsplitter 120. This light is reflected by the beamsplitter 120 as shown with arrows 133 toward the convergence or display plane 241 to form the 2D displayed image 240.

Additionally, though, this image 240 is increased in sharpness and brightness by the inclusion of a second retroreflector 270. This retroreflector 270 is positioned to have its reflective surface 272 facing and at an angle (e.g., 45 degrees) to the first or upper surface 122 of the beamsplitter 120 (or to be orthogonal to the display surface 214 and first reflective surface 132 of the first retroreflector 130). In this way, light 290 that is reflected from the first or upper surface 122 of the beamsplitter 120 (a portion such as 50 percent of the light 116 from the display element 212) strikes the reflective surface 272 of the second retroreflector 270. The retroreflector 270 functions to reflect this light (along parallel vectors) back through the beamsplitter 120 as shown with arrows 295 to combine with rays/light 135 from the first retroreflector 130 to form the 2D displayed (real) image 240 for viewing by the viewers 104, 106 as shown at 105, 107. In this way, the brightness (and sharpness) of the image 240 is increased (e.g., 80 to 100 percent) relative to the image 140 provided with a single retroreflector 130.

The image 240 may further be enhanced by including a lens element 280 with a single large lens or a plurality or array of many lenses (e.g., microlenses that may be chosen to have an f number in the range of 6 to 8 in some cases) on a surface 282 facing the first or upper surface 122 of the beamsplitter 120. The lenses on surface 282 may be spherical, hexagonal, or varied in shape and size but with a matching (or the same) focal length. The lens element 280 is spaced apart from the reflective surface 272 of the retroreflector 270 as shown such as by one focal length. The lens element functions to sharpen the displayed image 240, e.g., by changing or reducing the entrance angle of the retroreflector 270.

The display system 210 may further include one or more scrims 260 that are hung or positioned between the beamsplitter 120 and the convergence or display plane 241 for the displayed image 240. The scrim(s) 260 acts to allow a large percentage of the light 135 and 295, which in combination produce the displayed image 240, but also to block or reflect much of the ambient light in the space 200 so that the scrim 240 appears as a relatively opaque wall. Hence, the scrim 260 acts to disguise or hide the components of the display system 210 from the viewers 104, 106 including the beamsplitter 120, the second retroreflector 270, and the lens element 280. This further creates the illusion that the source of the floating image 240 is the lighting element 154 of the anchoring prop or pedestal 150.

The lens element 280 (or micro lens element 580 in FIG. 5) serves a useful and important function in the display systems by focusing or "sharpening" the images produced by the display systems. In practice (due to manufacturing tolerances and other parameters), retroreflectors do not act to perfectly return or send one ray back toward the source of light. Some small amount of light is instead returned within a cone, and the amount of light in the cone will vary such as less than one percent to several percent of the received light. Stated differently blur can be caused by imperfections in the retroreflecting material as many of the returned light rays are not collinear with the coming light ray due to these imperfections (e.g., offset from being collinear by a fraction of a degree which causes blur in the real image). This is a good enough result in many applications, but the inventors recognized that the use of sharpening or focusing elements (such as lens elements 280 and 580) are useful to try to get every or a greater amount of each ray to exactly go back toward the source to get a sharp and clear (or higher quality) real image. With this in mind, the inventors designed several sharpening or focusing elements (or assemblies) that can be used in the display systems of the present description such as in place of the lens element 280 or lens element 580 or with any of the retroreflectors shown herein in the display systems.

Figure 4:
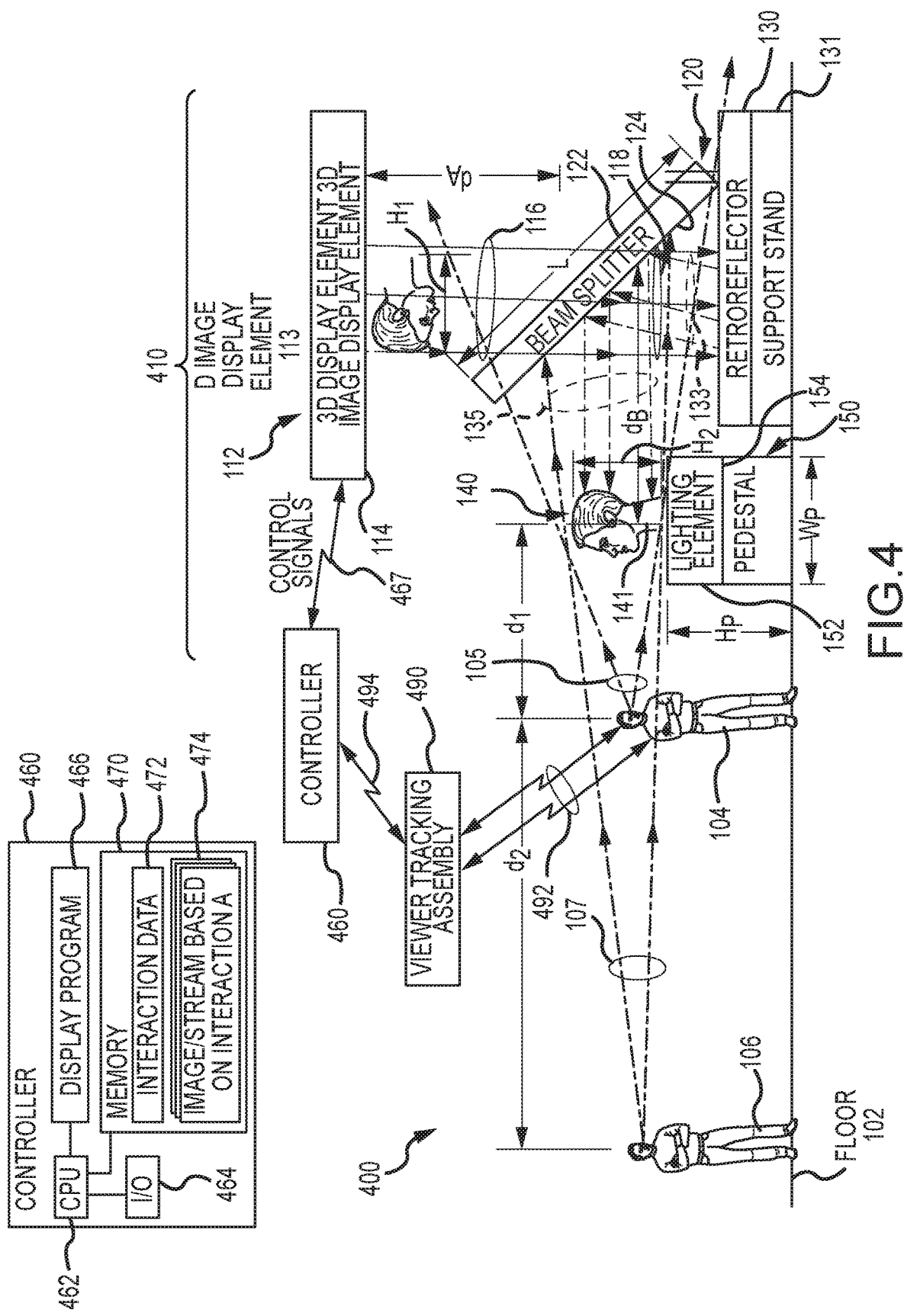
FIG. 4 is a side, schematic view or functional block diagram similar to that of FIG. 1 showing modification of the display system or apparatus to include interactive features and/or functionality.
Figure 5:
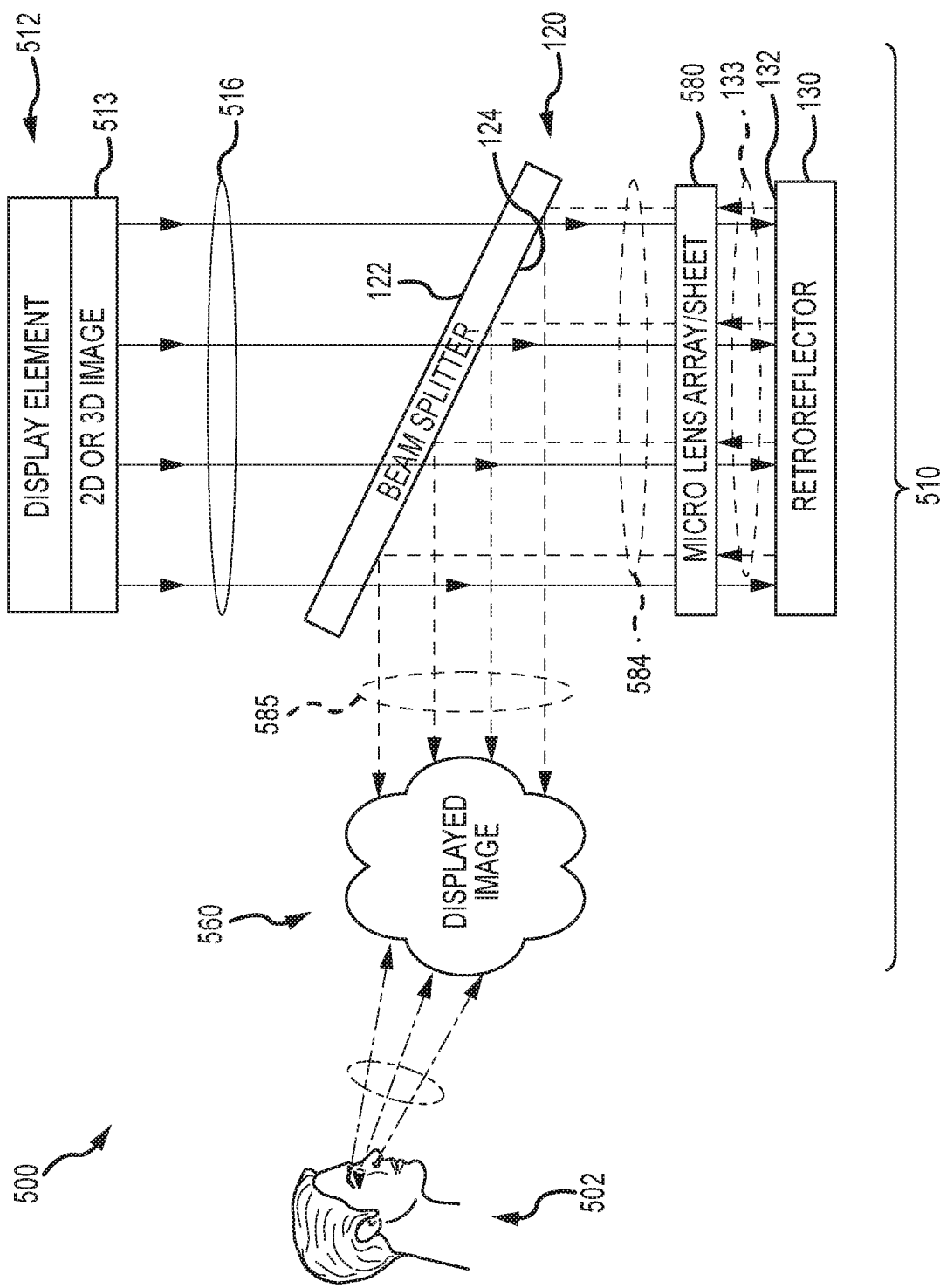
FIG. 5 is a side, schematic view or functional block diagram similar to FIG. 1 showing modification of the display system to include a micro lens element (e.g., a sheet or array) to enhance clarity of the displayed image.
Figure 6:
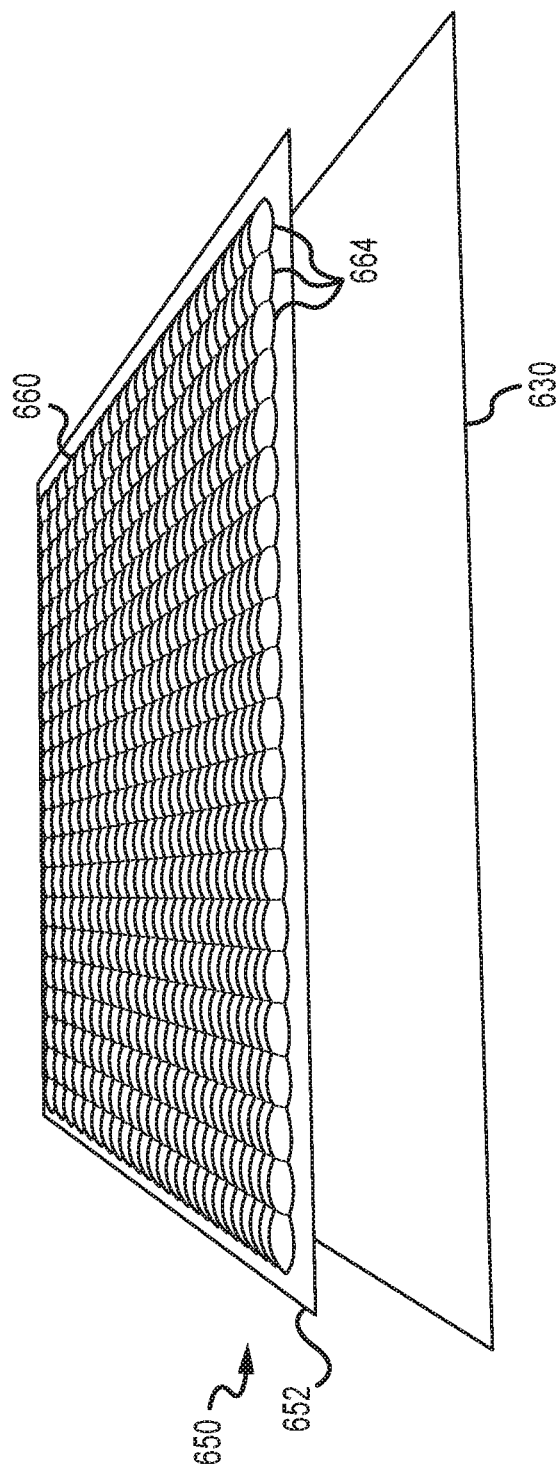
FIG. 6 illustrates a side perspective view of a retroreflective sheet paired with a sharpening or focusing element for use in any of the display systems of FIGS. 1-5.

In this regard, FIG. 6 illustrates a retroreflective sheet or retroreflector 630 that may be used in any of the display systems described herein (e.g., any of the retroreflectors of FIGS. 1-5). A sharpening or focusing element 650 is paired with the retroreflective sheet 630 with a planar substrate or body (e.g., of transparent or at least translucent material such as a glass, plastic, ceramic, or the like) 652 arranged to be parallel to the sheet 630 and spaced apart as shown or in contact with the sheet 630. The sharpening element 650 includes an array 660 of convex lenses 664 arranged in parallel rows and columns. The convex lenses 664 act to focus the light in each "cone" from the retroreflective sheet into more of a single ray to focus or sharpen the 3D floating image provided by a display system with the retroreflective sheet 630.

The lenses 664 may be conventional convex lenses as shown. In other useful or even preferred embodiments, the lenses 664 may take the form of Fresnel lenses as these may be easier to manufacture than conventional convex lenses and easier to fabricate a large focusing element or sheet (e.g., one that is up to 10 foot by 10 foot or larger). In still other implementations, the lenses 664 may be provided in the form of zone plates. In some cases, the convex lenses 664 are configured to be astigmatic to provide preferential sharpening or focusing in either the vertical or horizontal direction, which may be desirable in some applications to provide a sharper image in one direction. In still other embodiments, the lenses 664 may be provided in the form of compound lenses (e.g., one or more lens per sheet area).

Figure 7:
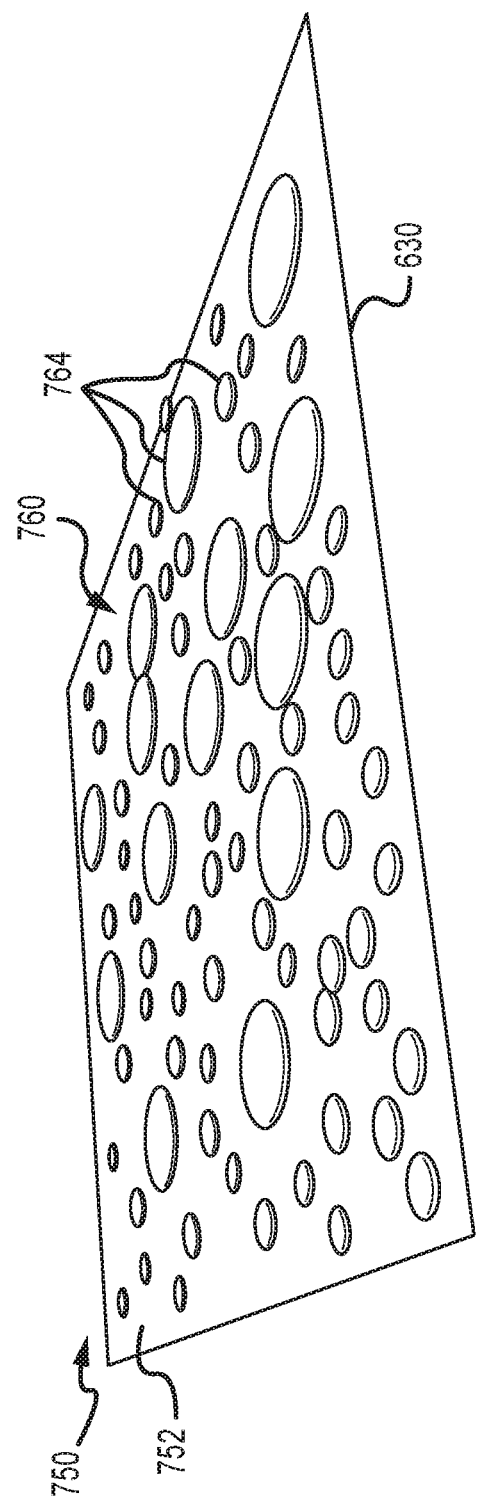
FIG. 7. Illustrates a retroreflective sheet paired with another embodiment of a sharpening or focusing element including convex lenses of differing sizes arranged in a random pattern (relative to the array of FIG. 6)

FIG. 7 illustrates another embodiment of a focusing or sharpening element 750 paired with a retroreflective sheet 630. In this implementation, the element 750 has its transparent body or substrate 752 mated with the retroreflective sheet 630 to be in contact with its upper surface (or the lenses 764 may be formed on the retroreflective sheet 630 in some cases). The sharpening element 750 includes an array 760 of convex lenses 764 as in the array 650 of FIG. 6. However, the lenses 764 vary from the lenses 664 in that they differ in size (and/or shape) and are arranged in a random or more random pattern than in the array 660 (note, it may be useful to have the lenses be of equal size but be arranged in a random pattern with this particular arrangement not shown in the figures but understood by those skilled in the art). As with the array 660, the lenses 764 may be conventional convex lenses, Fresnel lenses, or zone plates. Also, the lenses 764 can be astigmatic and/or compound.

Figure 8:
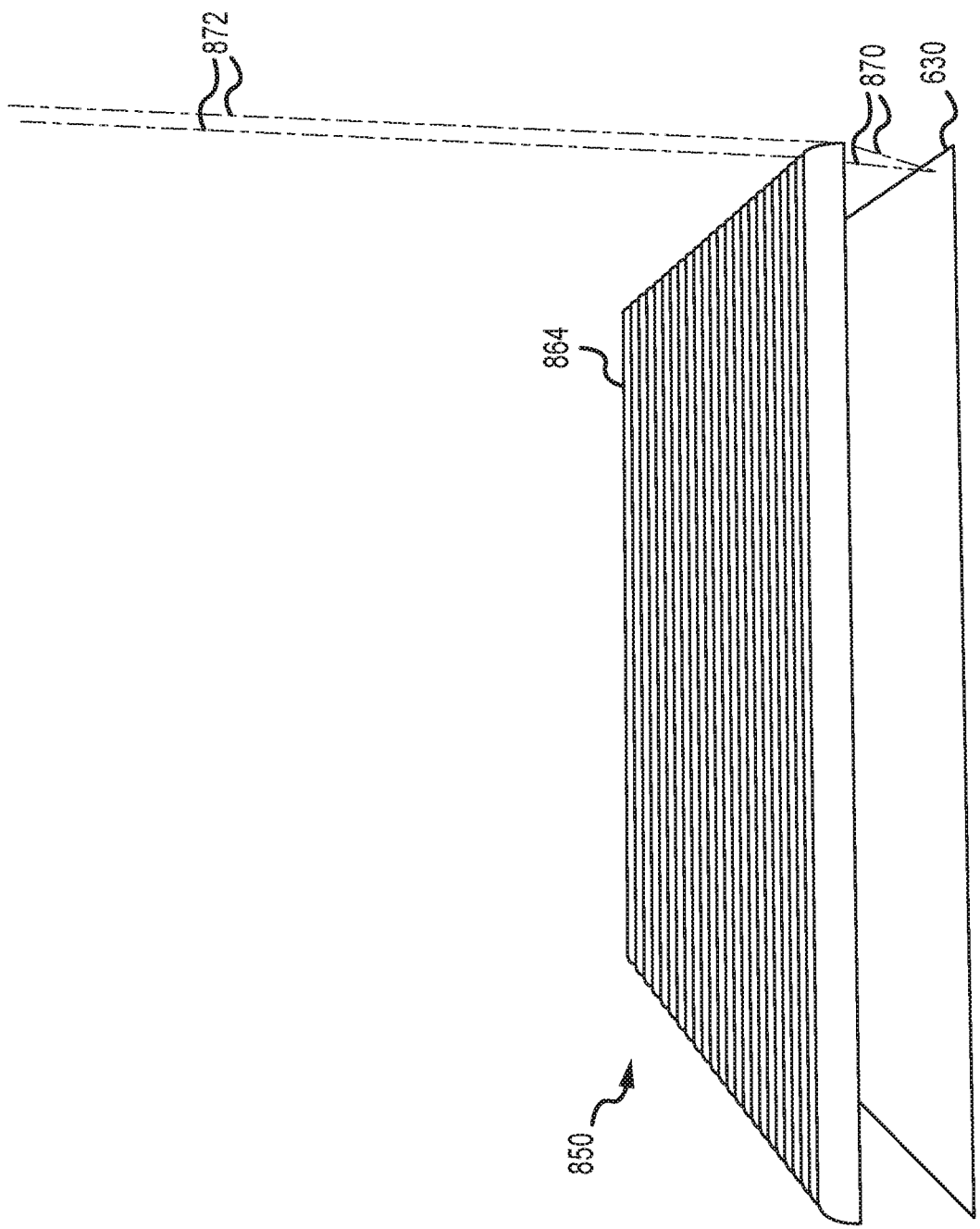
FIG. 8 illustrates a retroreflective sheet paired with another sharpening or focusing element that includes a plurality or array of lenticular lenses (or lenticules)

FIG. 8 illustrates another embodiment of a sharpening or focusing element 850 that may be used or paired with a retroreflective sheet 630 in one of the display systems of the present description. As shown, the sharpening element 850 comprises a substrate of a transparent (or at least translucent) material in which an array of lenses 864 in the form of lenticular lenses (or elongated, cylindrical lenses). The lenses 864 receive diverging light 870 from the retroreflective sheet 630 and sharpens the light as shown at 872 to be between two parallel lines (rather than spreading out in a cone). The lenses 864 are labeled as vertical or for use in providing vertical sharpening of light such as if placed in a vertical position in place of lens element 280 in FIG. 2. However, the lenticular lenses 864 may be rotated 90 degrees to provide horizontal sharpening or focusing such an application. The lenticular lenses 864 may be thought of as an extreme example of an astigmatic lens array as they do not provide the same magnification in either direction. Note, the lenses 864 are not shown to scale, and the focusing element 850 typically would include many more lenticules 864 (or at a much higher density) in practice.

Figure 9:
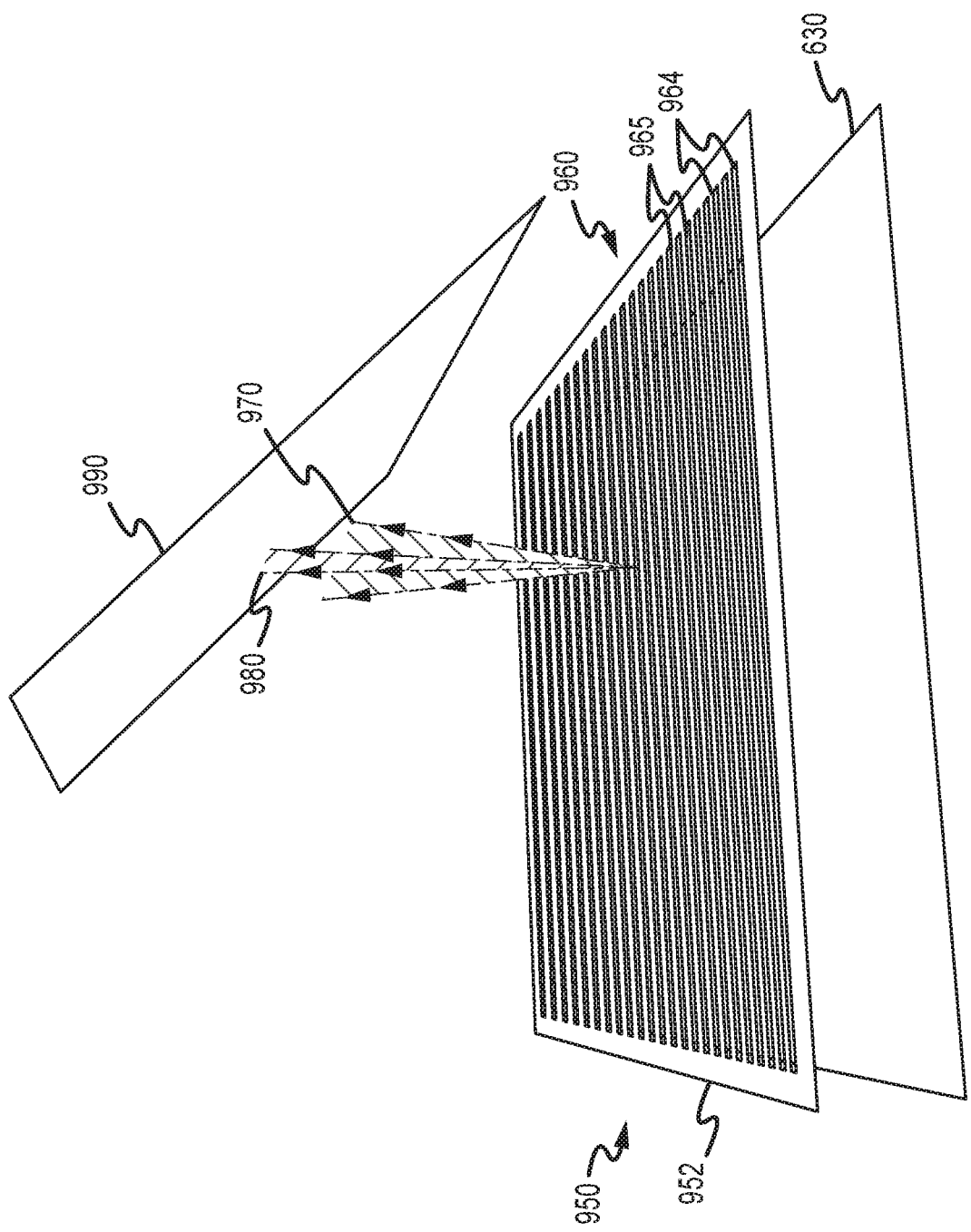
FIG. 9 illustrates a sharpening element disposed between a beamsplitter and a retroreflector, with the sharpening element making use of a plurality of elongated slits in an opaque (or less transparent) substrate.

FIG. 9 illustrates another focusing element 950 that may be positioned between a retroreflector 630 and a beamsplitter 990 of a display system (e.g., those shown in FIGS. 1-5)

of the present description. The focusing element 950 is formed with an opaque (or less transparent to light) substrate 952 and an array 960 of elongated slits (or slots) 964 (e.g., extend substantially from one end to the other of the substrate 952) are formed or cut in this substrate 952 between bars 965 of the material of the substrate 952. In this way, light reflected back from the retroreflector 630 is sharpened or focused in one direction as it passes through the slits 964. The slits 964 may be considered vertical slits (e.g., oriented so as to be vertical in respect to the projected real image) such as when the element 950 is arranged vertically in place of lens element 280 in FIG. 2, and used to sharpen horizontal retroreflection. This is shown in FIG. 9 with the cone 970 showing wider horizontal diffusion that would have resulted without the use of the focusing element 950 and with the cone of light 980 that has a narrowed horizontal retroreflected light swatch provided by the slits 964.

Figure 10:
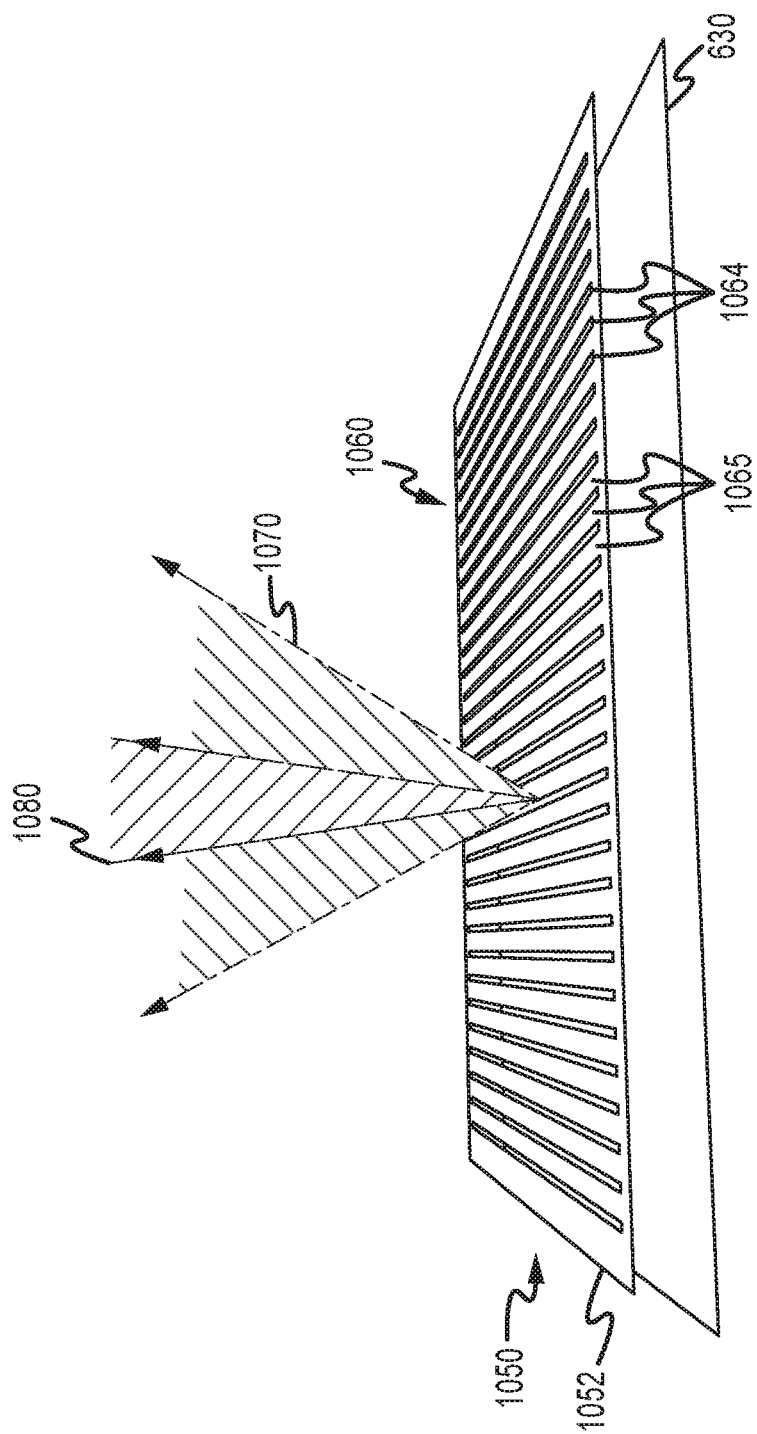
FIG. 10 illustrates a sharpening element similar to that of FIG. 9 but with horizontal slits providing vertical sharpening rather than horizontal sharpening.

In other embodiments, the slits may be rotated 90 degrees to provide horizontal slits used to sharpen vertical retroreflection. This embodiment is shown in FIG. 10 with the focusing element 1050 with an opaque substrate 1052 and an array 1060 of slits 1064 (between bars 1065 of substrate material) oriented horizontally with respect to the projected real image. This focuses the retroreflected light from a wide cone 1070 to a narrower vertical swath 1080. As with the lenticules 864 of FIG. 8, the slits 964 are not shown to scale and typically would be greater in number/density, and the size (width) of the slits 964 may vary widely to practice the focusing element 950.

Figure 11:
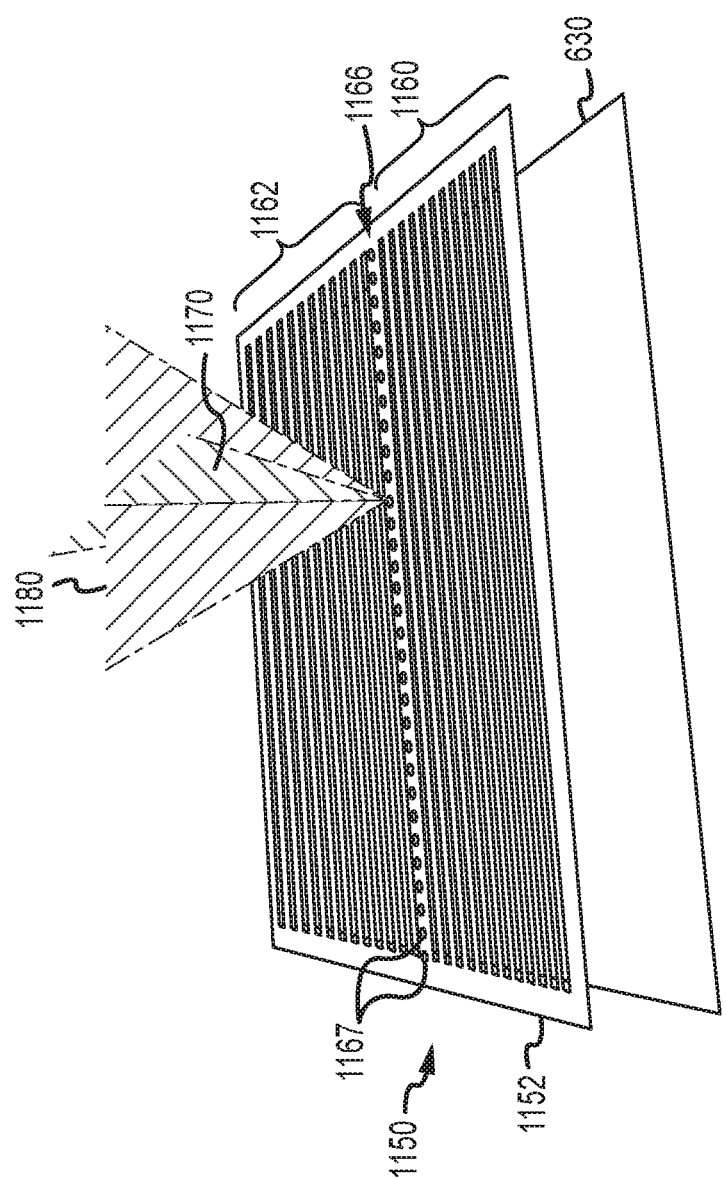
FIG. 11 illustrates an embodiment of a sharpening or focusing element paired with a retroreflective surface that makes use of a spatial light modulator to provide arrays of slits or pin-holes to provide an addressable and changeable sharpening of the retroreflection.

FIG. 11 illustrates another useful focusing or sharpening element 1150 that may be paired with a retroreflective surface 630 to provide spatially variable sharpening of the retroreflection. The sharpening element 1150 may be implemented using an addressable spatial light modulator (such as a liquid crystal display (LCD) or the like) with its screen 1152 selectively operated to be opaque or transparent to the light from the retroreflective sheet 630. In the non-limiting example shown in FIG. 11, the display screen/surface 1152 is configured to display first and second arrays of slits 1160, 1162 (e.g., alternating patterns of transparent slits and opaque bars) for providing horizontal (or vertical in other embodiments) sharpening of light from the retroreflector 630 as discussed with reference to FIG. 9).

Further, a row 1160 of pin-holes 1166, which may have nearly any desired size/diameter, are displayed between the slit arrays 1160, 1162 and provide transparency at the pin-holes 1166 and are opaque in the rest of the row 1160 (between the pin-holes 1166). The result of the use of the pin-holes 1166 is shown with the wide retro-reflected swath 1170 that would have occurred without the holes 1166 and with the narrowed retroreflected swath 1180 with the surface apertures or pin-holes 1166. With the use of the addressable spatial light modulator screen 1152 the locations and configurations (sizes, vertical versus horizontal, and so on) of the slit arrays 1160, 1162 and apertures 1166 are not fixed (e.g., pattern of slits and holes is not fixed or limiting of the focusing element 1150) and can vary to suit a particular display system or be varied over time (e.g., with a changing 3D real image or to achieve time varying visual effects). For example, narrower slits in the arrays 1160, 1162 may be used to provide increased sharpening of a real image over time.

Figure 12:
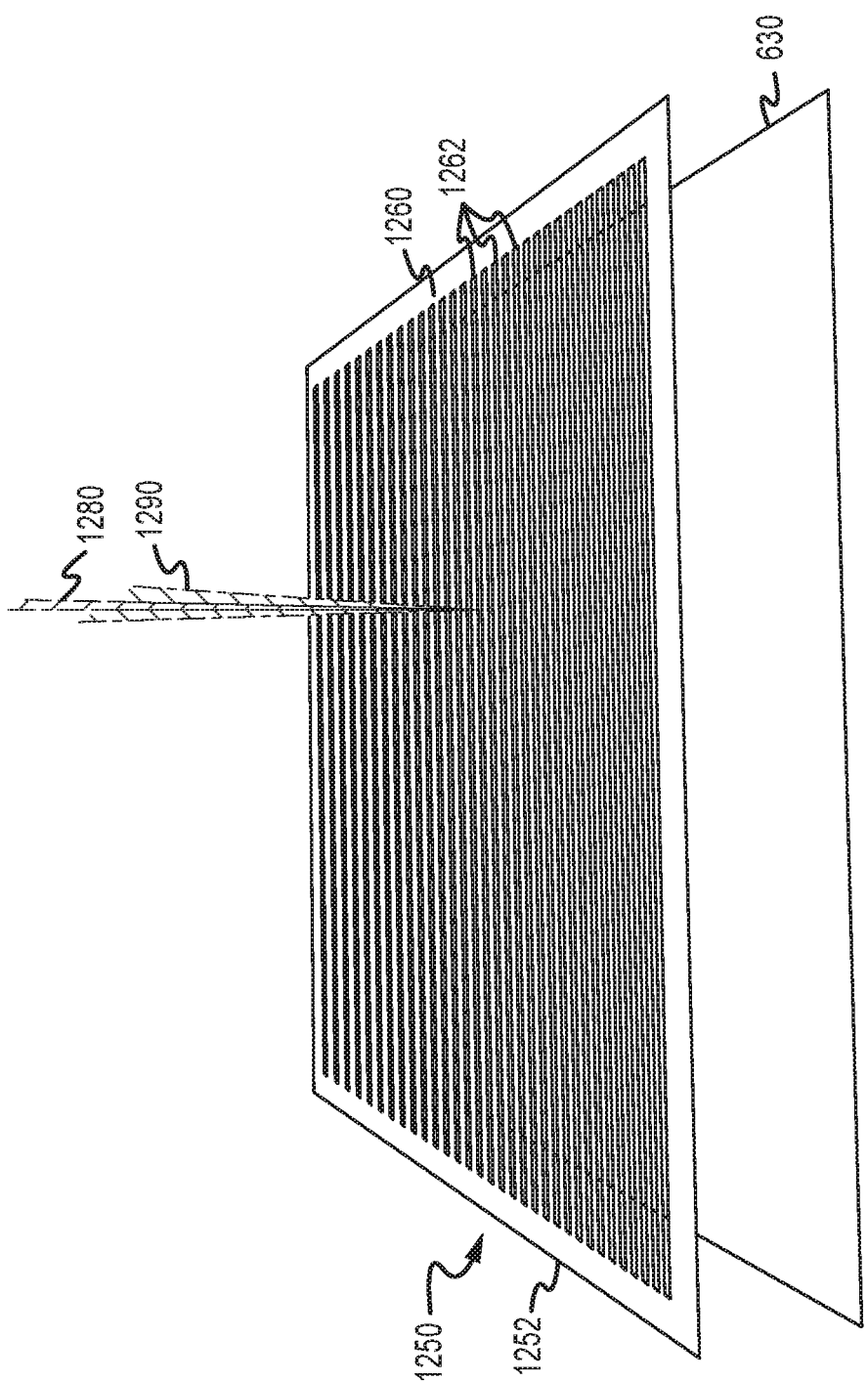
FIG. 12 illustrates another focusing element that provides preferential sharpening of polarized light when paired with a polarized light source and a retroreflective surface.

In some cases, the light being directed toward the retroreflector may be polarized light. In such cases, the focusing element 1250 may take the form shown in FIG. 12 with a substrate or sheet 1252 of polarized material. Then, an array 1260 of vertical slits or columns 1262 may be cut out of or formed in the substrate 1252. The retroreflector 630 in this case is chosen so as to provide a polarization maintaining retroreflective surface. Then, the focusing element 1250 acts to provide preferential sharpening of polarized light with the slits or columns 1262 as shown with the unpolarized light (or light with a polarization in a second direction) 1270 is output in a wider cone or swath while the polarized light aligned with the polarizer sheet 1252 is sharpened or focuses within narrower swath or cone 1280.

Figure 13:
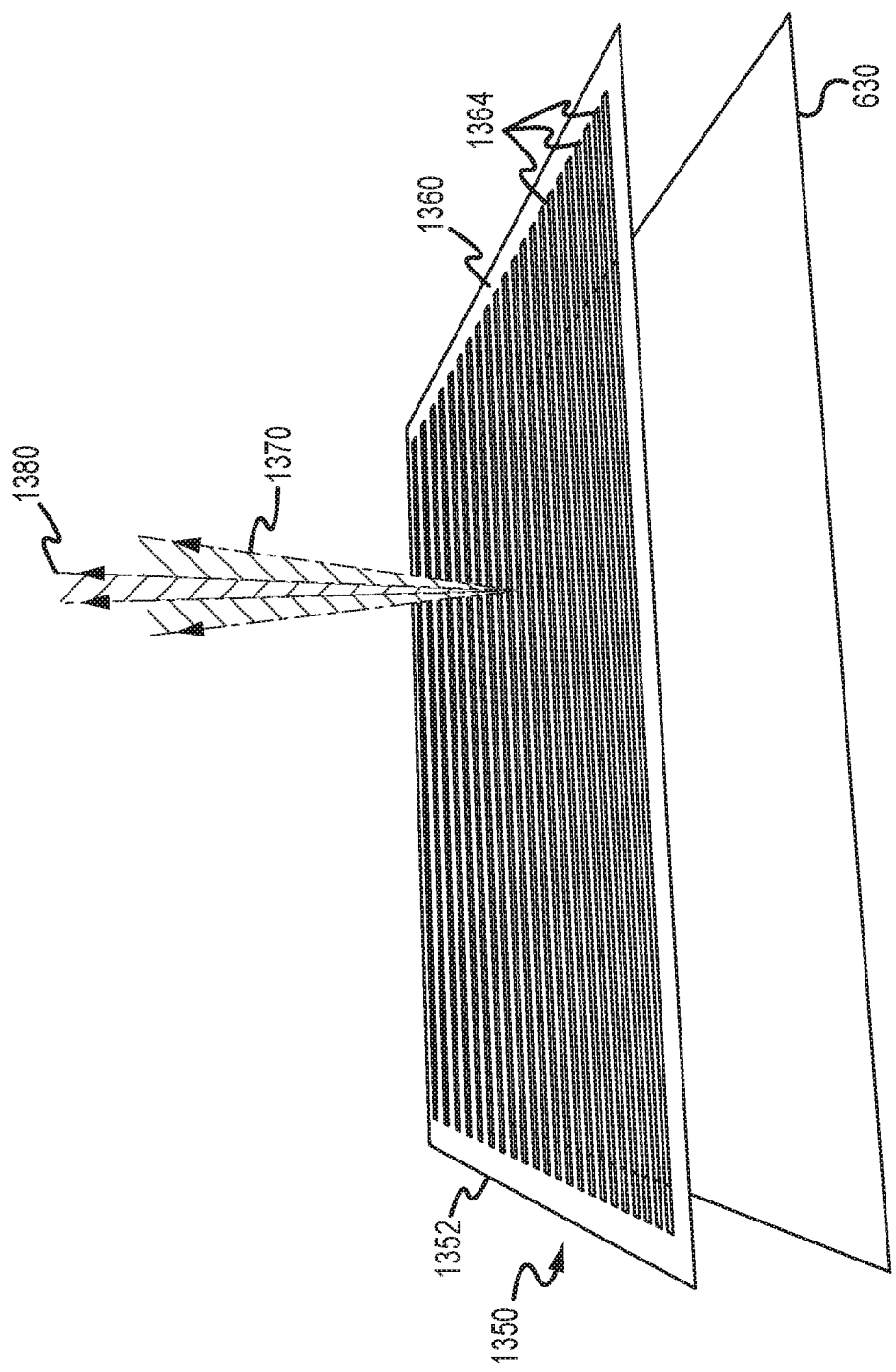
FIG. 13 illustrates yet another sharpening or focusing element that can be used with retroreflective sheet to provide color-selective sharpening.

Similarly, it may be desirable in some cases to provide color-selective sharpening. To this end, light from a source may include a least first and second colors (such as red and blue light), and it may be desirable to provide selective focusing or sharpening of the first color (or red light, in this non-limiting example) as it is retroreflected. FIG. 13 shows a focusing or sharpening element 1350 with a substrate or sheet 1342 of material that is transparent to the second color (to the blue light), and an array 1360 of slits 1364 are provided that are transparent to the first color (to the red light). In this way, the focusing element acts to selectively narrow or sharpen the first color (or the red light). This can be seen with the wider swath or cone of retroreflected light of the second color (or blue light) so that this light stays "blurry" while a narrowed retroreflected swath 1380 is provided by the slits 1364 so that the first color (or red light in this example) is sharpened to provide color-selective sharpening with the focusing element 1350.

The inventors recognized that observers of the display system may be able to perceive the existence of the sharpening or focusing element such as due to the patterns of the lenses or slits or may be able to see seams in the retroreflective material if smaller panels or sheets are assembled together to create a much larger sheet. To hide or disguise the presence of these components, it may be useful in some display systems to provide translation or translational movement of the sharpening element alone or along with the retroreflective sheet.

Figure 14:
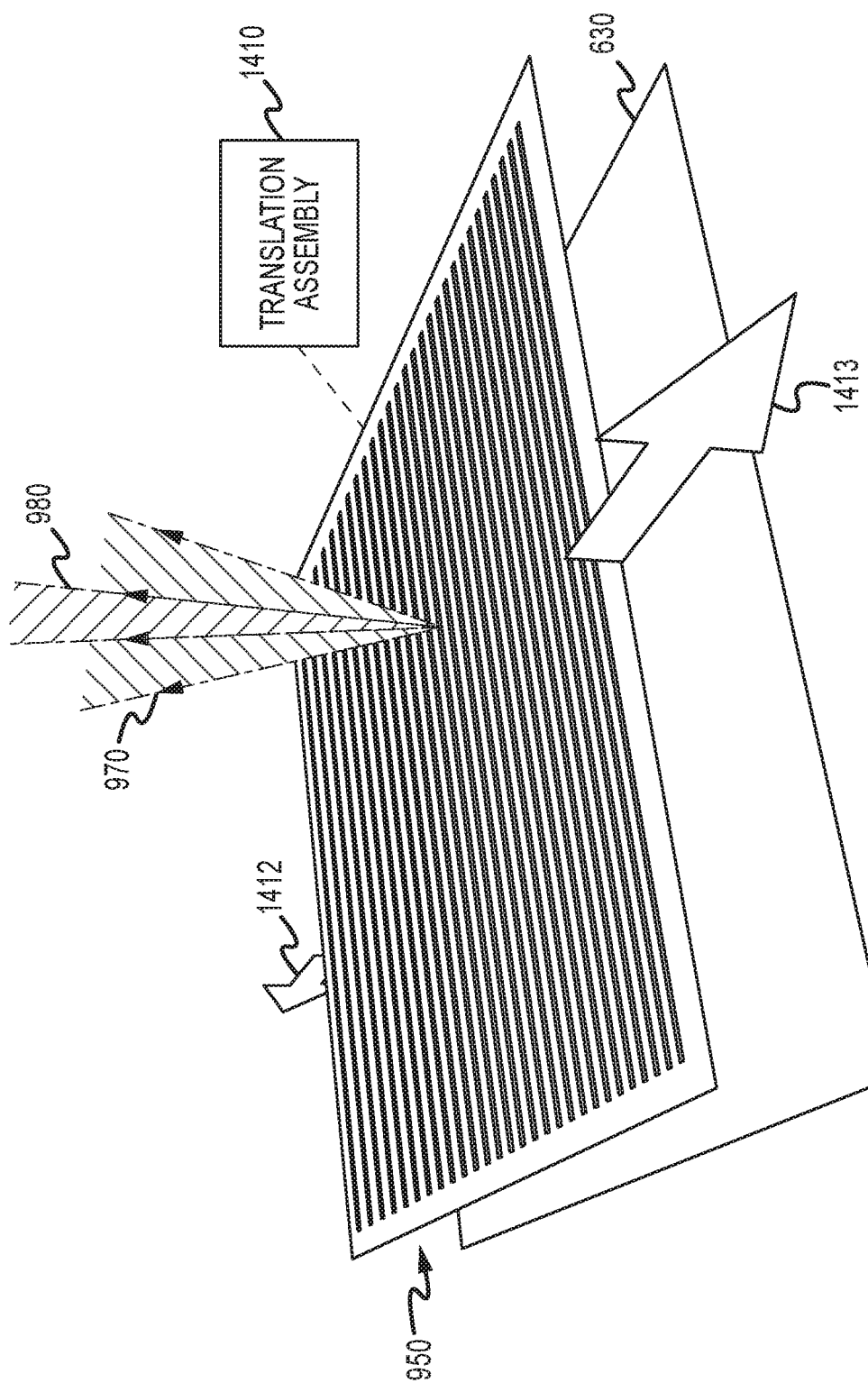
FIG. 14 illustrates use of a translation assembly to provide the focusing element translational motion to disguise or hide the presence of the focusing element to viewers.

FIG. 14 illustrates such a disguising or hiding embodiment with a translation assembly 1410 included to apply a translational motion 1412, 1413 to the focusing element 950 (alone or with the retroreflective sheet 630 if these two components are rigidly coupled together). The translation assembly 1410 may be configured to shake or vibrate the focusing element 950 to move the element 950 back and forth (in a relatively rapid manner or oscillating frequency) as shown with arrows 1412, 1413. In other cases, though, the focusing element (and, in some cases, the retroreflector 630) may be rotated by the translation assembly 1410 such as by applying the retroreflector 630 and focusing element 950 to a cylinder that is rotated or by providing the focusing element 950 as a large disc (with or without the retroreflector 630) rotated about a central axis. Other ways of translating the focusing element 950 may be used, and translation assembly 1410 may be used with the other focusing or sharpening elements to hide the focusing or sharpening elements (or seams in the retroreflector) such as by hiding presence of individual slits or lenses.

Figure 15:
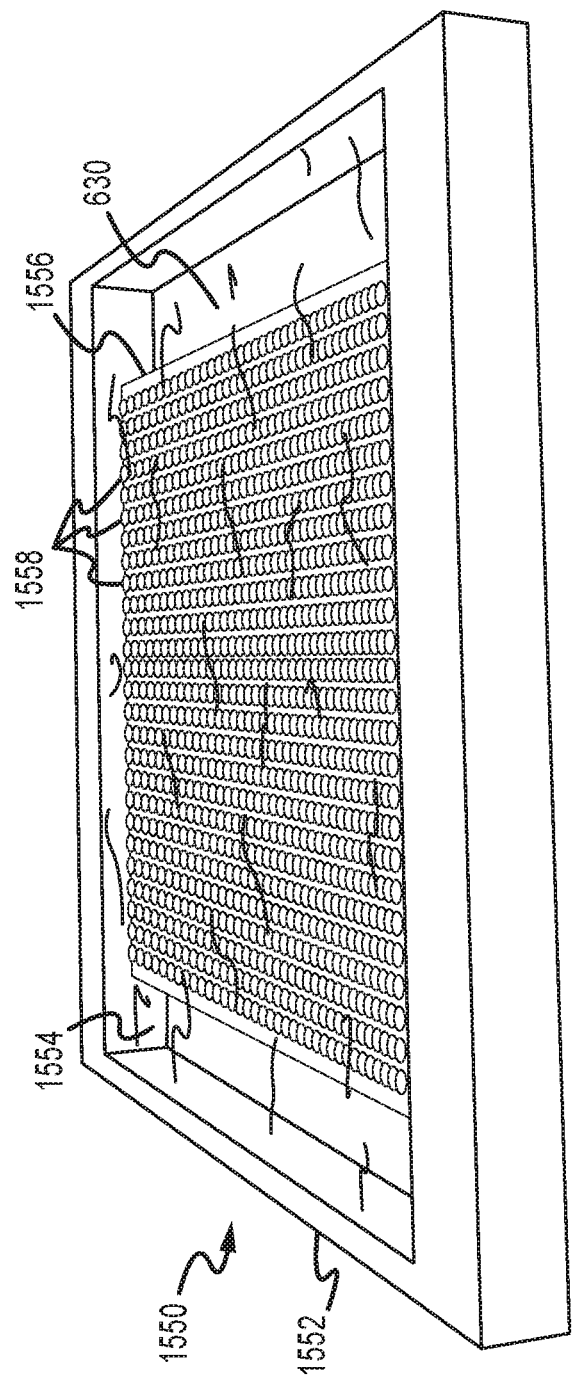
FIG. 15 illustrates a focusing element for use in sharpening or focusing retroreflection using liquid lenses.

FIG. 15 illustrates another useful focusing element 1550 that may be used with a horizontally arranged retroreflector 630 (such as retroreflector 130 in the display system 500 of FIG. 5) to provide clarifying or sharpening lenses. As shown, the retroreflective sheet or material 630 is provided as backing or a back plate for a liquid container 1552, which is shown to be in the form of four sidewalls defining a void or space. This void or space in the container 1552 is filled with a volume of a liquid 1554 (such as water) with desired optical properties. A sheet of perforated sheet or screen 1556 is lowered into or positioned in the liquid 1554 so as to be generally parallel to the retroreflector 630 (and upper surface of the liquid 1554). An array of liquid lenses 1558 is formed by surface tension as the perforated sheet 1556 is lowered on the surface of the liquid 1554, and these lenses 1558 act in a manner similar to convex lenses of the focusing element 650 to sharpen or clarify the real image formed with the retroreflector 630. The clarify of the real image can be varied in practice with the focusing element 1550 by moving the perforated sheet to differing depths relative to the upper/outer surface of the liquid 1554, with the image being clearer when the lenses 1558 are more curved and being less clear if lenses 1558 are flattened.

Figure 3:
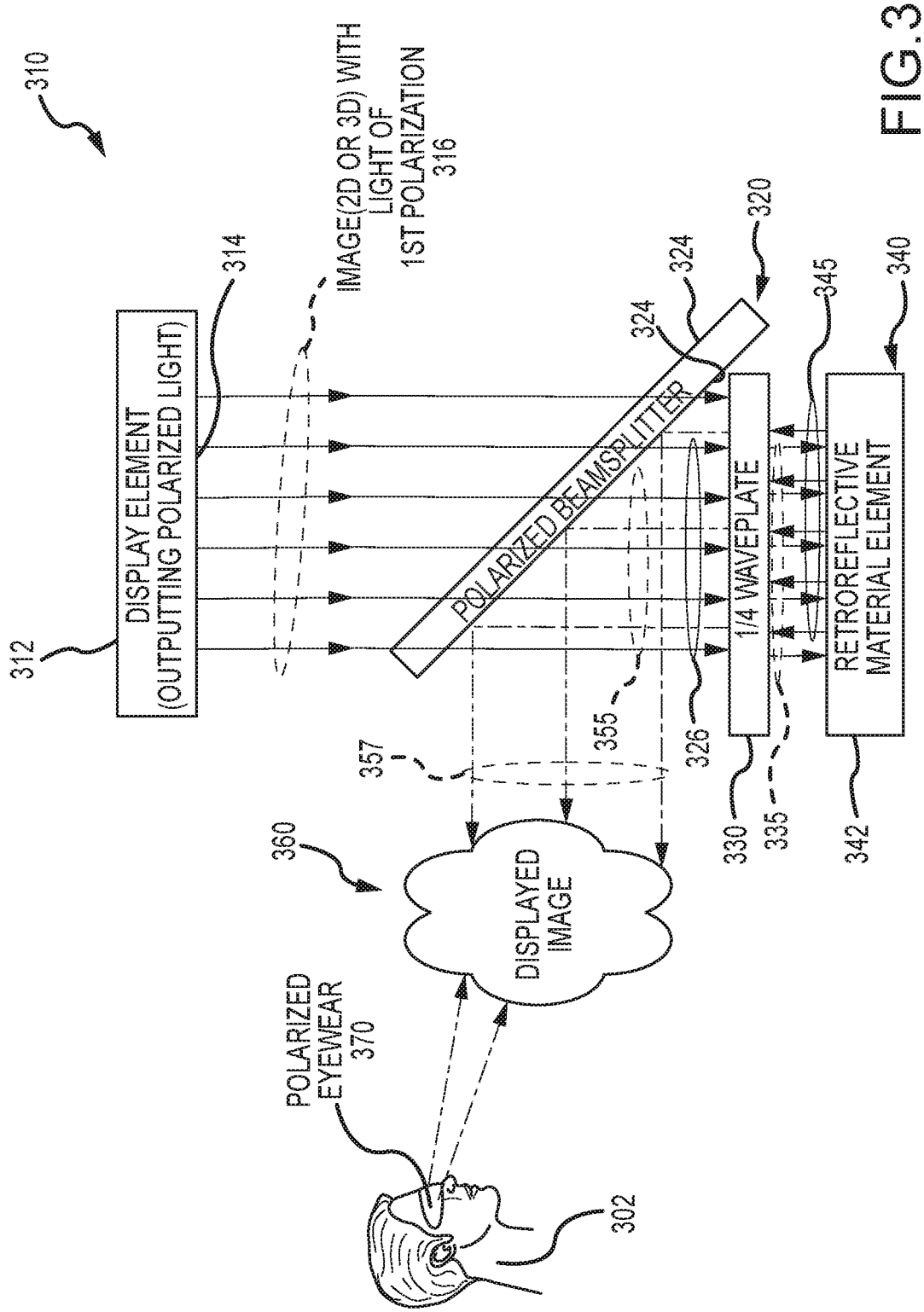
FIG. 3 is a side, schematic view or function block diagram of another embodiment of a display system or apparatus utilizing polarized light and a single retroreflector to provide a floating displayed image to a viewer.

FIG. 3 illustrates another embodiment of a display system 310 that is shown to be operating to produce or generate a displayed real image 360 to a viewer 302, with only a single retroreflector. In this embodiment, the viewer 302 observes the image 360 through special eyewear 370 in the form of polarized glasses or the like. In this regard, the display element 312 is configured to output or display an image on its display surface 314 with light 316 having a first polarization. The image displayed in screen 314 by display element 312 may be a 2D or a 3D image provided as a still or video image.

A beamsplitter 320 is positioned with a first or upper surface 322 facing the display element 312 at an angle (e.g., 45 degrees). Some of the light 316 is reflected away from the viewer (e.g., 50 percent), but the beamsplitter 320 is polarized (or configured) to be transmissive to light having the first polarization such that another portion or fraction (e.g., 50 percent) is transmitted through as shown with arrows 326. The display system 310 further includes a one-quarter waveplate 330 and a retroreflector 340 with its reflective surface 342 facing the beamsplitter 320 (e.g., with the surface 342 parallel to the planar display screen/surface 314). The waveplate 330 is disposed between the lower or second surface 324 of the beamsplitter 320 and the retroreflective material element 340.

During operation of the display system 310, the light 326 from the beamsplitter 320 passes through the waveplate 330 and its polarization is rotated 90 degrees (or a quarter turn) such that the light 335 striking the reflective surface 342 has a second polarization differing from the first polarization of the original image light 316. The retroreflector 340 reflects this light as shown 345 causing it to again pass through the ¼ waveplate 330, which acts to modify or rotate the polarization again by 90 degrees or a quarter turn such that the light 355 from the retroreflector 340 that strikes the second or lower surface 324 of the polarized beamsplitter 320 has a third polarization differing from both the first polarization and the second polarization.

The beamsplitter 320 is configured to not be transmissive to light with this third type of polarization (e.g., light not having the first polarization as found in light 316 from display element 312), and, as a result, as shown with arrows 357, all or a large percentage of the light 355 is reflected into a display space to produce or generate the displayed image 360. This image 360 can then be viewed by the viewer 302 with eyewear 370 adapted for viewing light with the third polarization. When compared with system 110 with its single retroreflector 120, the display system 310 is able to provide a brighter image 360 with a display element 312 having the same luminence capability as the display element 112 as less light is lost via the beamsplitter 322 as is the case with beamsplitter 120.

In some cases, it may be desirable for the image to be displayed in a manner that is interactive with the viewer 104 and/or 106. FIG. 4 illustrates an interactive display space or environment 400 including another embodiment of a display system 410, which builds upon and modifies the display system 110 (with similar components shown with like reference numbers). In other cases, though, the modifications shown to system 110 may be applied to system 210 or system 310 or a combination of systems 110, 210, 310, and 410 may be made to rearrange and/or use differing sets of the various components taught herein to provide a desired visual effect.

To this end, the display system 410 includes a viewer tracking assembly 490 that senses as shown with arrows 492 a location and/or movement of the viewer 104 relative to the location of the convergence or display plane 141 and displayed image 140. The tracking assembly 490 may take many forms to practice the display system 410 such as a motion or video tracking hardware and software as will be well understood by those skilled in the arts. The tracking assembly 490 responds to the position/motion tracking 492 to transmit interaction data to a controller 460 as shown with wired or wireless signals 494.

The controller 460 may take the form of a computing or electronic device with a processor 462 for managing/running input/output (I/O) devices 464 such as a wireless transceiver for receiving the communications 494 from the viewer tracking assembly 490. The controller 460 also is shown to include (or have access to) memory or data storage devices 470 that store, under control of the CPU 462, the received interaction data 472 and also one or more images/video streams 474.

The memory 470 may also store executable code or programming instructions that are executed or performed by the processor 462 to provide the functionality of a display program 466. This functionality includes processing the interaction data 472 about the viewer 104 and their interaction with the displayed image 140 and, in response, generating control signals 467 causing the display element 112 to operate to display an image 113 using (or by playing) one or more of the images/image streams 474 (which are chosen or modified based on the interaction data 472). In this manner, a user/viewer 104 can interact in a live manner (e.g., to play a game, to operate/change a displayed control panel, and so on) with the displayed image 140 and/or any props 150 in the display space or environment 400. This is achievable in some regards because the exact location of the displayed image 140 and/or convergence plane 141 is a known value for the display program 466 (and may be stored in memory 470) such that the viewer's position is relative to the displayed image 140.

FIG. 5 shows another useful embodiment of a display environment or space 100 in which a display system or apparatus 510 of the present description is operating to display a floating 2D or 3D image 560 to a viewer 502. The floating image 560, as in the system 110 of FIG. 1, may be displayed over a top surface of a prop in the form of a pedestal or table to provides the viewer 502 with context or an anchor for perceiving the floating image 560 with more comfort or with less eye strain that may occur when a floating image is provided in a disconnected manner in space. Further, as in system 110, the image 560 may be caused to appear to have its source at the pedestal surface by providing a lighting element or source on or near the surface such that the image 560 appears to be a hologram originating from the lighting element.

To produce the image 560 (2D or 3D in this example), the display system 510 includes a 2D or 3D display element 512 with an outer display surface or the like, and display element 512 is operated to display a 2D or 3D image 513 (e.g. at the outer display surface or with multi-layer or planar display screens or the like). For example, the display element 512 may be an LCD or similar display device operable to provide a 2D or 3D image 513 on its display surface. This may be a high brightness image 513 such as by selecting the LCD or other display device to be daylight-viewable (e.g., a device with luminance of 1500 to 2500 Nits or high levels of illuminance). The display element 512 is shown to be arranged to be facing downward (e.g., its display screen is parallel to the floor/ground of the space 500) to project or display the image 513 downward as shown by arrows 516 (representing light emitted or projected from display element 512). In other embodiments, the display element surface 114 may be oriented differently such as to be vertical or at any useful angle relative to the other system components.

The display system 510 further includes a beamsplitter 120. The size of the floating image 560 matches that of output image 513 from display element 512 by having the distance from the upper or first surface 122 of the beamsplitter 120 to the display screen/surface matching the distance from the lower or second surface 124 of the beamsplitter 120 to the image display or focal plane (as explained in detail with reference to FIG. 1). The beamsplitter 120 is chosen to be large enough (e.g., with an adequately large length, L, that is greater than a width of the display surface 114 or at least greater than the height, $H_1$, of the image 513) such that when it is arranged at an angle (e.g., 45 degrees as shown) to the display element 512 it can receive all (or most) of the light 516 associated with the image 513. The beamsplitter 120 is transmissive to the light 516 (as well as reflecting a portion off of the upper or first surface 122 away from the viewer 502, and, as a result, light 516 associated with the image 513 passes through the beamsplitter 120.

Significantly, the display system 510 also includes a retroreflector (or retroreflective element) 130 positioned with its reflective surface 132 facing the second or lower surface 124 of the beamsplitter 120 (and the display element 512). As discussed for system 110 of FIG. 1, the retroreflector 130 may be mounted on a support stand or frame so as to be planar and parallel to the display element 512 (or its display screen(s)/layer(s)) (as well as the floor of space 500), which results in the reflective surface 132 being at an angle (such as 45 degrees) relative to the beamsplitter surface 124. The reflected light 133 from the retroreflector 130 strikes the lower or second surface 124 of the beamsplitter 120. A portion is reflected as shown with arrows 585 while another portion is transmitted through the beamsplitter 120 (not shown in FIG. 5). The light 585 acts to create or produce the displayed, floating image 1560, which in this example may be a 2D or 3D image (still or video).

The display system 510 differs from system 110 in another significant way. The system 510 includes a micro lens element 580 in the form of a sheet or array of lenses. The micro lens element 580 is positioned between the lower or second surface 124 of the beamsplitter 120 and the reflective surface 132 of the retroreflector 130. In this embodiment, the micro lens element 580 is a planar sheet or pane and is arranged to be parallel to the reflective surface 132. It receives the light 133 reflected from the retroreflector 130 and passes this light as shown at 584 to the second or bottom surface 124 of the beamsplitter 122 where it is reflected as the light 585 that produces displayed image 560. The micro lens element 580 may be spaced apart from the reflective surface 132 by a relatively small distance such as 1 to 12 inches with a spacing in the range of 2 to 4 inches used in some prototyped embodiments.

The micro lens element (e.g., an array or sheet of micro lenses) 580 may take a variety of forms to practice the display system 510. The micro lens element 580 is chosen and/or configured to act or function to clarify the displayed image 560 compared to a display system without such as micro lens element in which the image may look less clear or even blurry (which may be a useful or desired result, though, in many applications as it provides a unique "ghostly" effect). The resulting increase in clarity can be surprisingly large such as the displayed image 560 being 2 to 10 times (or more) clearer than in the system 510 without the micro lens element 580. The micro lens array 580 may include a random pattern of small lenses so that the human eye typically will not pick up a repeating pattern in the displayed image 560.

Figure 16:
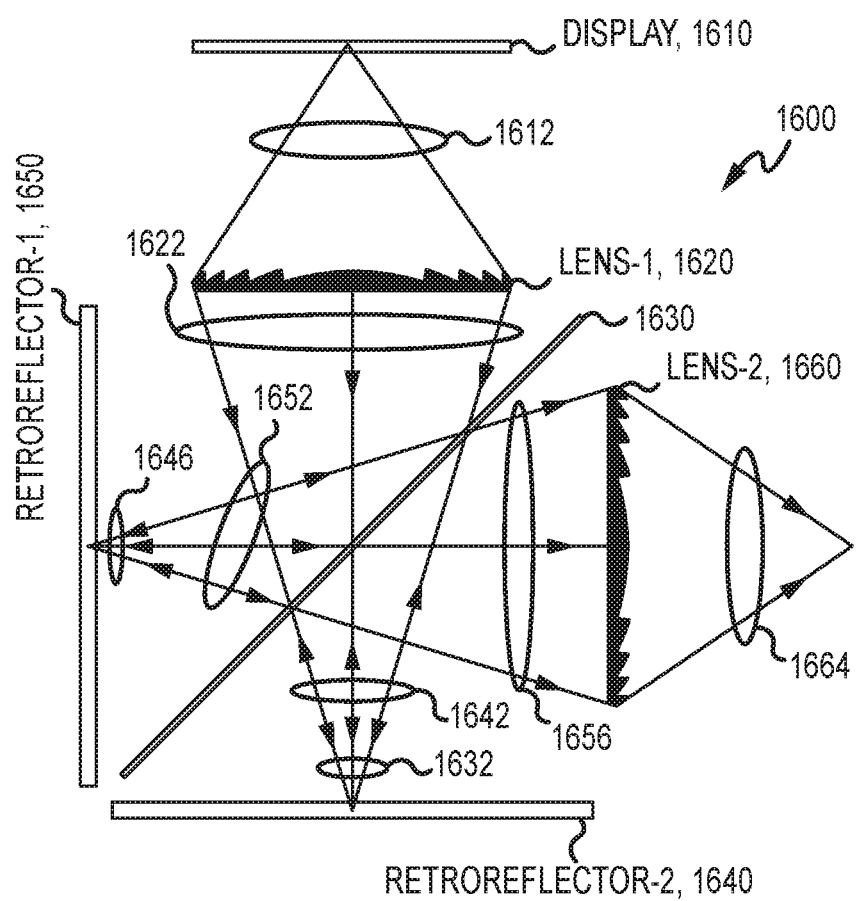
FIG. 16 illustrates a display system that uses two lenses along with two retroreflectors to provide a floating image.

FIG. 16 illustrates another embodiment of a display system 1600 that makes use of two lenses 1620, 1660 along with two retroreflectors 1640, 1650 to achieve a floating image with light/rays 1664 from second lens 1660. In system 1600, the display 1610 displays an image causing light or rays 1612 to be transmitted onto a first lens 1620, which focuses the light 1622 onto a first side/surface of a beamsplitter 1630. A portion 1630 of the light 1622 passes through the beamsplitter 1630 onto one of the retroreflectors 1640 to provide retroreflection 1642 back toward the second side/surface of the beamsplitter 1630, where it is reflected as light 1656 to the second lens 1660 for focusing as shown at 1664 to provide a floating image viewable by a viewer (not shown). The light 1656 directed toward the second lens 1660 also includes retroreflection 1652 passing through the beamsplitter 1630 from another retroreflector 1650 provided by light 1646, which is light 1622 from the first lens 1620 that is reflected by the first side/surface of the beamsplitter 1630.

As can be seen in FIG. 16, two lenses 1620, 1660 (i.e., one before the beamsplitter 1630 and one after) are used rather than a double pass through a single lens or lenslet array in front of the retroreflector. The retroreflected double pass through a single lens is self-correcting to aberrations (any aberrations introduced during the first pass through the lens is corrected by the light following the same path back through the lens in the opposite direction). Passing through two different lenses 1620, 1660 (one before the beamsplitter 1630 and one after) has a similar effect (although not as perfectly, since there may be slight variations between the lenses). The lenses 1620, 1660 typically would be larger lenses or coarse arrays because they still need to focus on the retroreflector sheet 1640 or 1650. The large lenses 1620, 1660 clarify the image provided by light/rays 1664 while also keeping the system 1600 relatively compact (as the lens/retroreflector spacing is not all behind the beamsplitter 1630).

Figure 17:
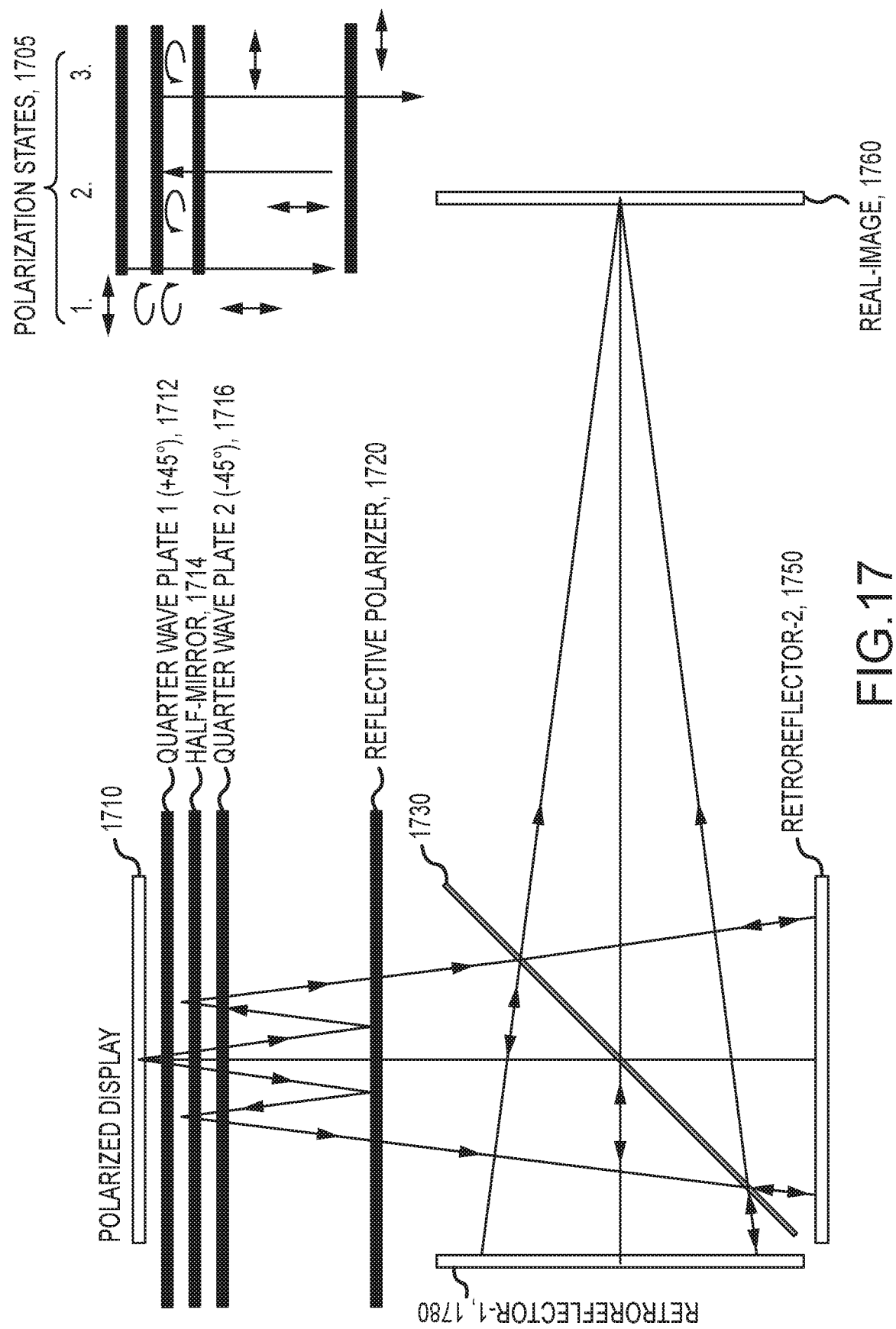
FIG. 17 illustrates a display system embodiment utilizing a polarized display along with a pair of retroreflectors to provide a floating real image in a display or viewing space.

FIG. 17 illustrates another embodiment of a display system 1700 that is configured to provide a pancake retroreflective real image 1760. To this end, the system 1700 includes a polarized display 1710 that passes light through a stack or optical stack prior to striking a beamsplitter 1730 positioned (e.g., at 45 degree angles) between first and second retroreflectors 1740, 1750. The optical stack includes a first quarter wave plate (e.g., +45 degrees) 1712 proximate to the display 1710, a half mirror 1714, a second quarter wave plate (e.g., +45 degrees (while some embodiments may use a −45 degrees quarter wave plate combined with wave plate 1712)) 1716 distal to the display 1710 (with the half mirror 1714 sandwiched between the two quarter wave plates 1712, 1716), and a reflective polarizer 1720 proximate to the beamsplitter 1720. The polarization states within this stack are shown with graph 1705.

The optical stack in the display system 1700 of FIG. 17 is a stack of wave plates and polarizing beamsplitters that cause the light or path from display 1710 to bounce back and forth on itself to reduce the path length, e.g., like "pancake optics" used in flight simulator collimators (whereas display system 1700 uses an arrangement for relaying an object to form a real image and without an imaging or relay lens element). One of the issues with retroreflectors that was identified by the inventors is that the object and image are 1:1, and, as a result, the distance of the real image from the beamsplitter is the same distance from the object to the beamsplitter. This can cause the size of the display system to become bulky and burdensome in some cases. Using the stack of wave plates and polarizer as shown in FIG. 17 can shrink the size of the system 1700 as the distance from the object (display 1710) to the beamsplitter 1720 can be reduced by two-thirds of the distance (without use of the optical stack). This occurs before the beamsplitter (and lens array/lens element and retroreflector). It also does not involve or pass through a lens element to form a real image, and it can in some implementations only involve film sheets after the display 1710 such that it should be scalable.

Figure 18A:
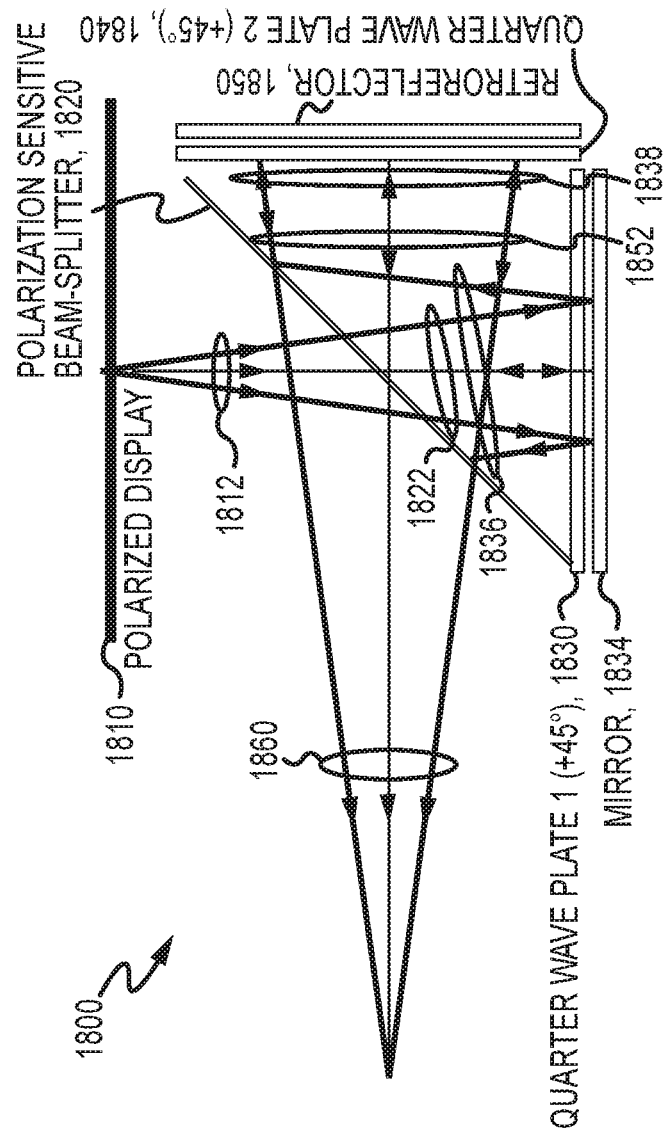
FIGS. 18A-18D illustrate another display system embodiment utilizing a polarized display and a retroreflector to generate a floating real image in a display or viewing space.
Figure 18B:
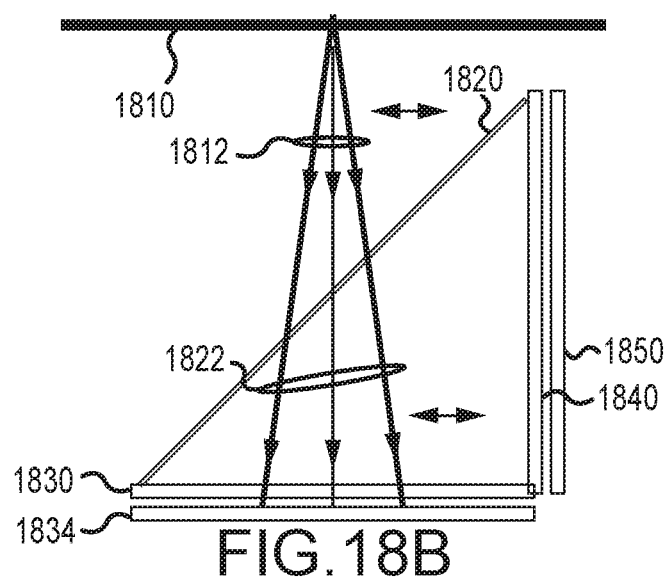
Figure 18C:
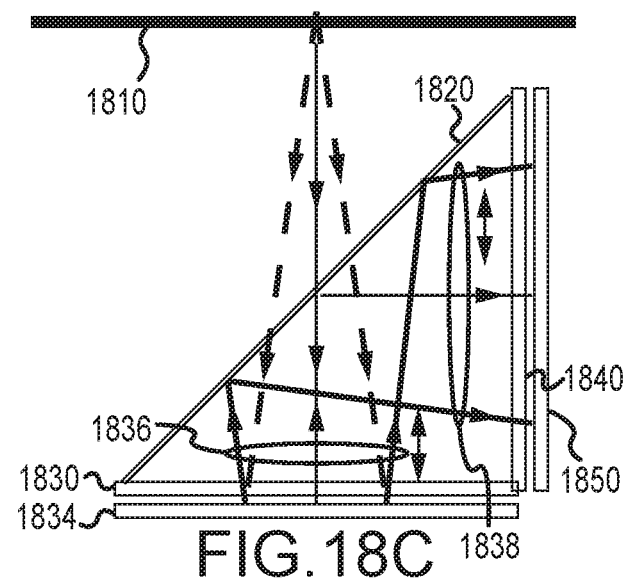
Figure 18D:
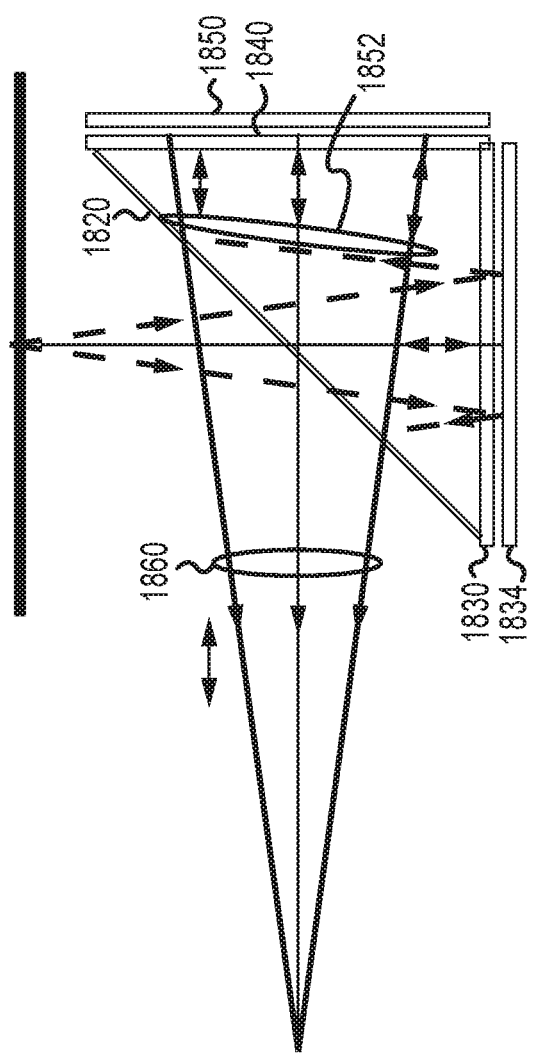

FIGS. 18A-18D illustrate an additional useful embodiment of a display system 1800 that combines the efficient display system of FIG. 3 that used a polarization beamsplitter and a quarter wave plate with the compact pancake retroreflective system of FIG. 17 to obtain a new compact and efficient retroreflective real image (in a display space with light/rays 1860 in FIGS. 18A-18D). FIG. 18A illustrates the overall system 1800 as it operates to provide the real image while FIGS. 18B-18D illustrate effects or changes to the light from the display 1810 as it passes through or is reflected from each optical component of the display system 1800.

As shown, the display system 1800 includes a polarized display 1810 outputting or displaying imagery as shown with light/rays 1812 that strikes a first surface of a polarization-sensitive beamsplitter 1820. The light 1812 is transmitted through the beamsplitter 1820 as shown at 1822 where it is received/strikes a combination of a first quarter wave plate (e.g., +45 degrees) and a mirror 1834. The light 1836 is reflected back toward the second surface of the beamsplitter 1820 where it is reflected as shown at 1838 toward a combination of a second quarter wave plate 1840 (e.g., +45 degrees) and a retroreflector 1850. The retroreflection or light 1852 is then transmitted back to the second surface of the beamsplitter 1820, and it passes through as shown at 1860 to form a real image (e.g., a space/location where the light/rays 1860 are focused) viewable by a viewer (not shown) in a display space.

As shown, the polarized display light 1812 passes through (as shown at 1822) through the polarization-sensitive beamsplitter 1820. It then passes through a quarter wave plate 1830 and reflects off a mirror 1834, which creates a virtual display below the beamsplitter 1820 and changes the polarization from horizontal to circular (in this example). The reflected light 1836 passes back through the quarter wave plate 1830 changing the polarization from circular to vertical. The light 1836 (now shown as 1838) then bounces off the polarization-sensitive beamsplitter 1820 and passes through a second quarter wave plate 1840 (changing the light from vertical to circular polarization) to a retroreflector 1850. The retroreflector 1850 sends the light 1852 back toward where it came from and rotates its polarization again (e.g., from circular to horizontal), which can then pass through the polarization-sensitive beamsplitter 1820 as shown at 1860 to form a real image twice (or more) as far from the beamsplitter as the distance between beamsplitter 1820 and the display 1810. The real image is formed without the loss of light through the beamsplitter 1820, as may be the case in some other display system embodiments. Hence, the display system 1800 removes the inefficiency of the half-mirror of the pancake version (e.g., system 1700 in FIG. 17) and makes the efficient version (e.g., system 300 in FIG. 3) more compact.

Figure 19A:
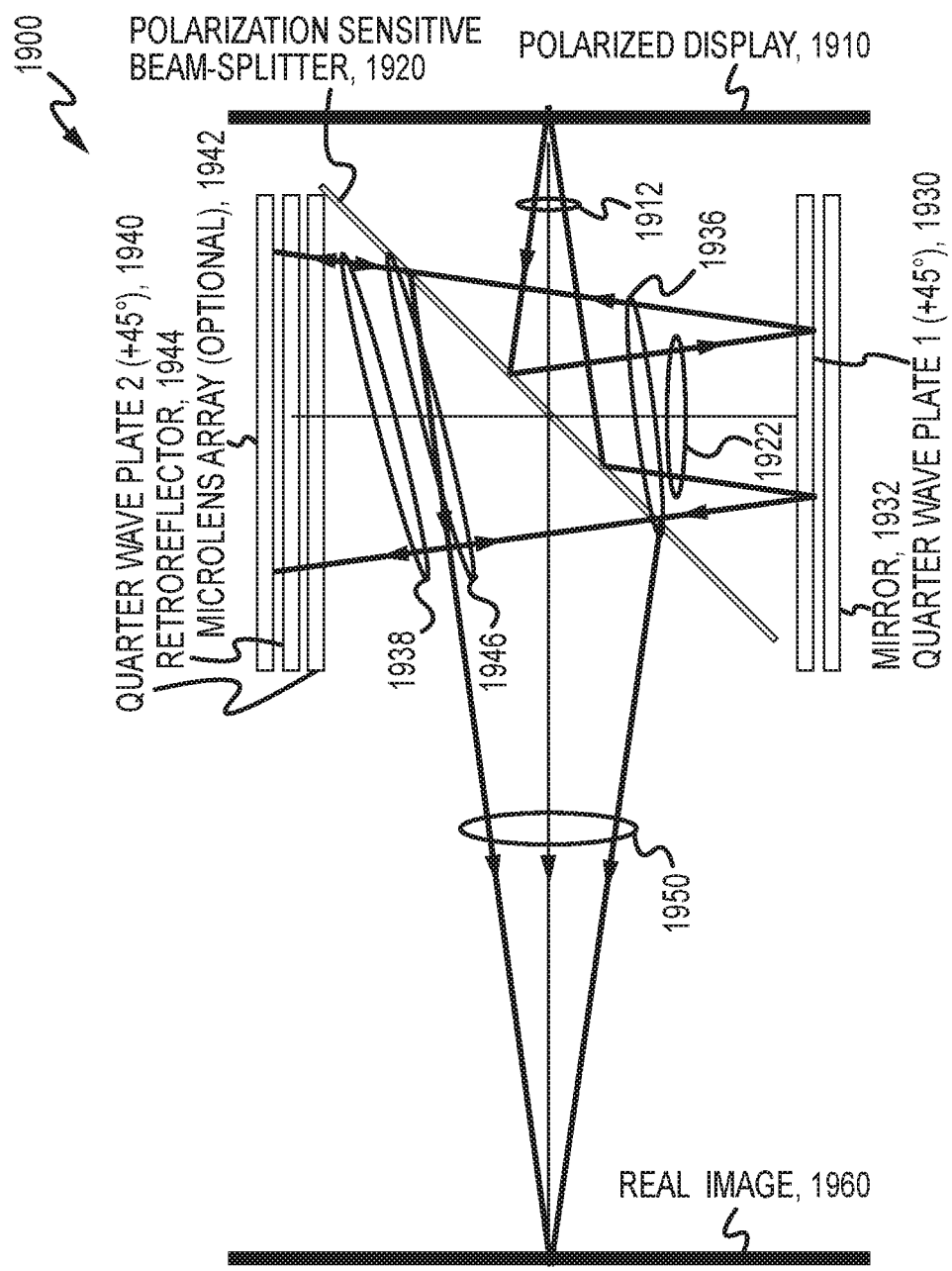
FIGS. 19A-19D illustrate another display system embodiment that is similar to the system of FIGS. 18A-18D but with an inline arrangement instead of using a 90-degree bend.
Figure 19B:
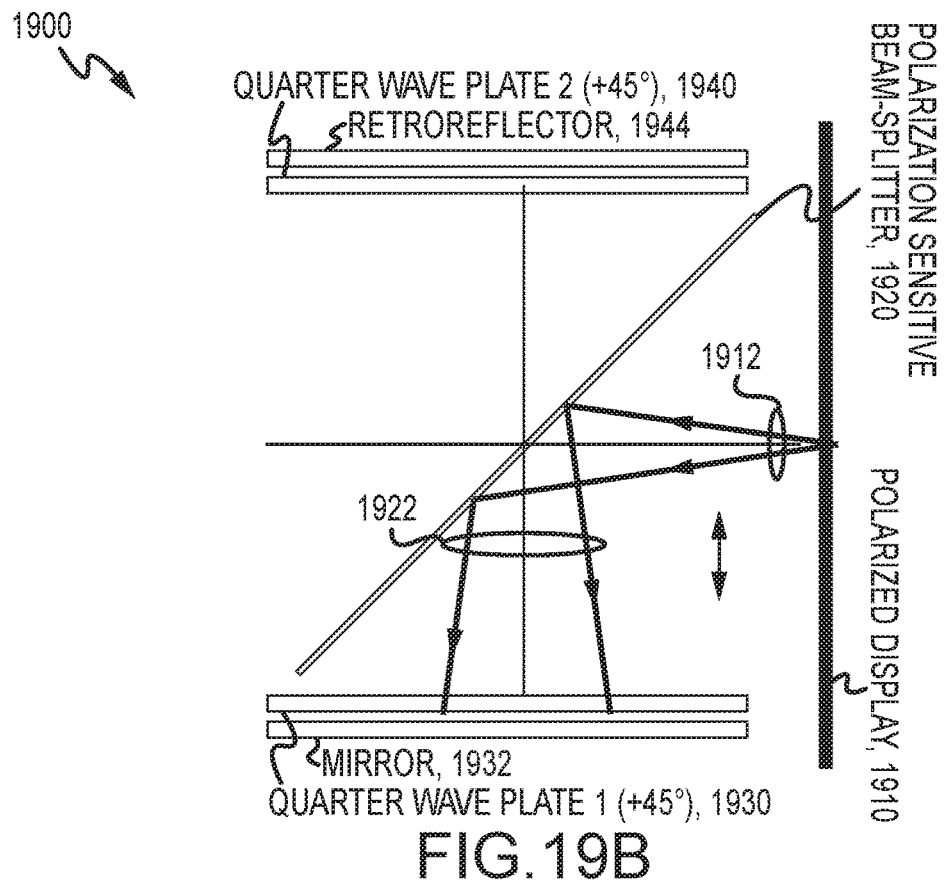
Figure 19C:
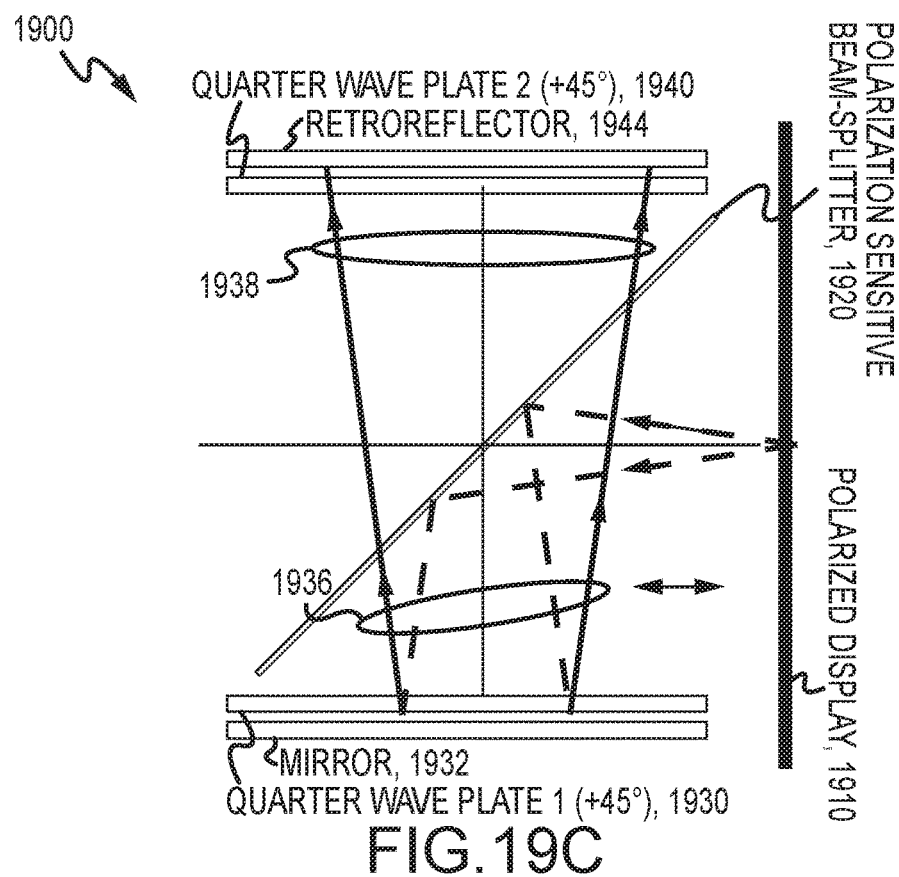
Figure 19D:
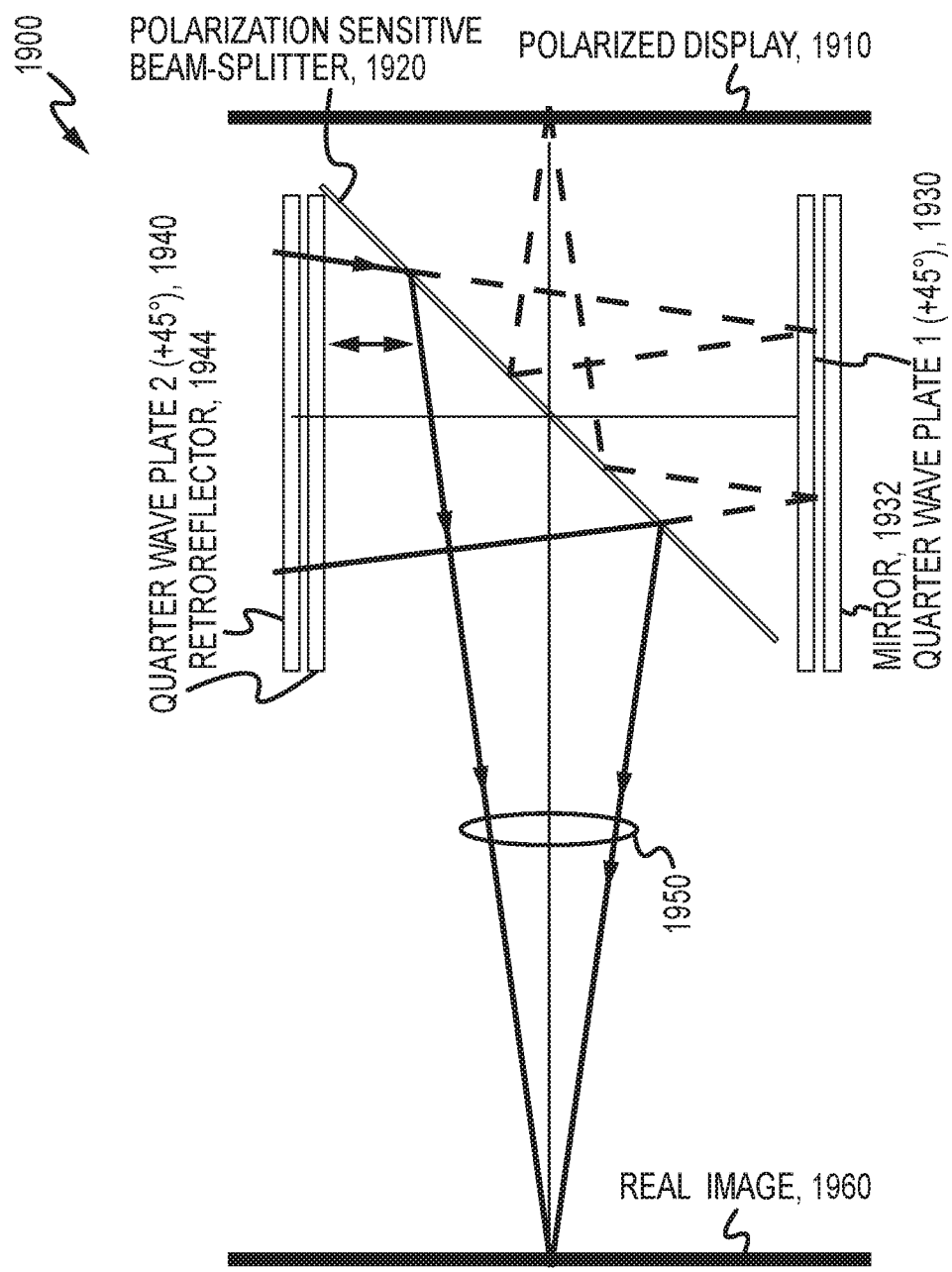

In some cases, it may be desirable to avoid the 90-degree bend in system 1800 of FIGS. 18A-18D and, instead, provide an inline arrangement between the display element and the display space or real image location. FIG. 19A shows such a system 1900 with FIGS. 19B-19D (similar to FIGS. 18B-18C) showing polarization states as the light passes through the display system 1900. As shown, the display system 1900 includes a polarized display 1910 that is oriented to face outward to a display space and a location planned for a displayed real image 1960. A polarization sensitive beamsplitter 1920 is provided in the system 1900, and output light (polarized light providing the display's image) 1912 from the polarized display 1910 is directed onto a first surface of the beamsplitter 1920.

Due to its polarization, the light 1912 is reflected as shown at 1922 toward a combination of a quarter wave plate (e.g., +45 degrees) 1930 and a mirror 1932. These two components 1930 and 1932 may be parallel to each other and orthogonal to the display 1910. Light 1936 reflected from the mirror 1932 (and passing twice through wave plate 1930) is directed back towards the first surface of the beamsplitter 1920, where due to its changed polarization it is passed or transmitted through as shown at 1938. The light 1938 is directed toward a combination of a second quarter wave plate (e.g., +45 degrees) 1940, an optional micro lens array or lens element 1942 for sharpening the imagery, and a retroreflector 1944. These three components may also be parallel to each other and also to the first quarter wave plate 1930 and mirror 1932 (e.g., the mirror 1932 faces the retroreflector 1944). The light or retroreflection 1946 from the retroreflector 1944 (which has passed twice through the wave plate 1940) is directed back toward the mirror 1932 where it strikes the second surface of the beamsplitter 1920. Due to its changed polarization, it is reflected as shown at 1950 from the beamsplitter 1920 and acts to generate a real image 1960 at a desired location in the display or viewing space of system 1900.

The display system 1900 efficiently provides a retroreflective real image 1960 inline with display 1910, and the display system 1900 is compact. It is desirable to provide an inline arrangement at least for the reason that most lenses and other 1:1 imaging devices presently in use are inline. Use of a 90-degree bend can make a display system more cumbersome, e.g., the display may need to be suspended and facing the floor. In the imaging or display system 1900, the system acts more like a normal imaging lens except with no aberrations (except for the retroreflective blurring, which can be fixed with the use of the optional micro lens array 1942). Significantly, the distance from the real image 1960 to the beamsplitter 1920 is three times the distance between the display 1910 and the beamsplitter 1920, which means the display system 1900 is very compact (relative to other display arrangements shown herein, for example). The use of quarter wave plates 1930, 1940 and the polarization-sensitive beamsplitter 1920 makes the display system 1900 efficient (e.g., when compared with display system 1700 of FIG. 17). Each component in the display system 1900 may be implemented as a film so that the display system 1900 should be readily scalable.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, a 2D or 3D display element may include an LED chase or row that may be operated to sequentially illuminate a plurality of LEDs to provide a moving or changing streak of light or another illuminated shape or object at the convergence or display plane in the viewing space. This real, displayed image can be provided at a known location relative to a portion or surface of a prop positioned a predefined distance (e.g., a distance, $d_B$, from the second or lower surface of the beamsplitter as shown in FIG. 1) in the display space. Any distance, $d_B$, may be used, but one in the range of 3 to 10 feet (closer rather than farther away) may be desirable to provide a clearer or sharper-focused displayed image.

In some embodiments, the display system is configured to spin both a reflector and a lens/lens array together. In this way, the spinning lens array (or half of a disc could be used) does not have to be edge driven to keep the center of the lens array clear. With both retroreflector and lens/lens array spinning together, the shaft can be centered behind both (which is easier to do than edge driving). Also, the display system has a clear center (e.g., no obstructing drive shaft), and the display system hides both retroreflector and lens seams when spun fast enough or at high enough speeds.

In other display system arrangements, a strip of the retroreflector is spun with or without a lens or lens array. This is similar to a transparent retroreflector real image. For example, it may be desirable to use a transparent retroreflector (combined with projectors) for HUDS (heads up displays or heads up display systems), but it would also be interesting for a real image character that does not appear in front of a retroreflective backdrop and/or scrim that would just appear in front of any background. A beamsplitter is still provided in front of the spinning strip of retroreflector. Note, there are other transparent retroreflectors, e.g., the corner cube array that is not metallized or a bunch of concave divots in a plastic sheet.

We claim:

1. An apparatus for generating floating images, comprising:
   a display element providing a 2D or 3D image with first light;
   a retroreflector comprising a reflective surface facing the display element and including a retroreflective material;
   a beamsplitter disposed between the display element and the retroreflector with a first surface facing the display element to receive the first light, wherein the beamsplitter transmits a portion of the received first light as second light toward the reflective surface of the retroreflector, wherein the reflective surface reflects the second light as third light toward a second surface of the beamsplitter that is opposite the first surface, and wherein the beamsplitter reflects a portion of the third light as fourth light into a display space to provide a displayed image at a distance from the second surface of the beamsplitter;
   a controller; and
   a viewer tracking assembly, wherein the viewer tracking assembly tracks at least one of movement of a viewer or location of the viewer relative to the displayed image and wherein the controller controls the display element to modify the 2D or 3D image based on processing of the tracked movement or location of the viewer.

2. The apparatus of claim 1, wherein the tracked movement or location viewer involves interaction with the displayed image or a prop positioned proximate to the displayed image.

3. The apparatus of claim 1, wherein the display element comprises a 2D or 3D object with a 2D or 3D surface providing the first light.

4. The apparatus of claim 1, wherein the display element comprises a multiplane display element and wherein the 2D or 3D image is a 3D image.

5. The apparatus of claim 1, wherein the display element comprises an LED chase or row and wherein the 2D or 3D image comprises a moving or changing streak of light or an illuminated shape.

6. The apparatus of claim 1, wherein the reflective surface and the display surface are planar surfaces, wherein the reflective surface is parallel to the display surface, wherein the first surface of the beamsplitter extends at an angle of 45 degrees relative to the display surface, wherein the displayed image is a real image provided at a convergence plane located the distance from the second surface of the beamsplitter, and wherein the first surface of the beamsplitter is located a second distance, equal to the distance from the second surface of the beamsplitter, from the display surface.

7. The apparatus of claim 1, wherein the display element comprises a monitor with an output luminance of at least 2500 Nits and wherein the display element comprises a liquid crystal display (LCD) monitor.

8. The apparatus of claim 1, further comprising a second retroreflector positioned with a reflective surface including retroreflective material facing the first surface of the beamsplitter and oriented to be orthogonal to the reflective surface of the retroreflector.

9. The apparatus of claim 1, further comprising a prop in the display space with a surface below, above, or to the side of the displayed image, wherein at least a portion of the surface of the prop is located at a separation distance from the second surface of the beamsplitter that equals the distance between the displayed image and the second surface of the beamsplitter.

10. The apparatus of claim 1, wherein the first light from the display element has a first polarization, wherein the beamsplitter is polarized to be transmissive to light having the first polarization and to reflect light with other polarizations, wherein the apparatus further comprises a waveplate between the second surface of the beamsplitter and the reflective surface of the retroreflector, wherein the second light has a second polarization and the third light has a third polarization, and wherein the third polarization differs from the first polarization.

11. The apparatus of claim 1, further comprising a focusing element positioned between the second surface of the beamsplitter and the reflective surface of the retroreflector, the focusing element being adapted to clarify the displayed image.

12. The apparatus of claim 11, wherein the focusing element comprises a planar array of convex lenses of differing sizes arranged in a random pattern.

13. The apparatus of claim 11, wherein the focusing element comprises an array of convex lenses and wherein the convex lenses are Fresnel lenses, zone plates, astigmatic, or compound.

14. The apparatus of claim 11, wherein the focusing element comprises a sheet of lenticular material.

15. The apparatus of claim 11, wherein the focusing element comprises a sheet of opaque material including an array of elongated, side-by-side slits formed in the opaque material to transmit light through the focusing element and wherein the elongated, side-by-side slits are arranged to provide sharpening of vertical retroreflection or horizontal retroreflection.

16. The apparatus of claim 11, wherein the focusing element comprises an addressable spatial light modulator selectively operable to concurrently display an opaque pattern and a transparent pattern and wherein the transparent pattern includes at least one of an array of transparent slits and a pattern of transparent apertures.

17. The apparatus of claim 11, wherein the focusing element comprises a sheet of polarized material with horizontal or vertical columns to provide sharpening of light of a predefined direction of polarization in the third light from the retroreflector and wherein the reflective surface of the retroreflector comprises a polarization maintaining retroreflective surface.

18. The apparatus of claim 11, wherein the focusing element comprises a substrate of material transparent to light of a first color and an array of vertical or horizontal slits in the substrate that are transparent to light of a second color, whereby rays of the second color are sharpened by the focusing element.

19. The apparatus of claim 11, wherein the focusing element comprises a liquid container, a volume of liquid disposed in the liquid container, and a perforated sheet disposed in the volume of liquid to a depth, whereby an array of liquid lenses is formed for focusing the third light.

20. The apparatus of claim 11, further comprising a translation assembly applying a translational motion to the focusing element, wherein the translational motion is vibration or rotation.

21. The apparatus of claim 20, wherein the retroreflector is coupled to the focusing element whereby the translational motion is concurrently applied to the retroreflector by the translation assembly.

22. A display system, comprising:
a display providing a 2D or 3D image, wherein the display element comprises at least one of a 2D or 3D object with a 2D or 3D surface, a multiplane display element, an LED chase or row, and a monitor;
a first retroreflector with a planar reflective surface facing the display to reflect the 2D or 3D image;
a beamsplitter disposed between the display and the reflective surface of the first retroreflector, wherein the beamsplitter is oriented at an angle relative to the reflective surface whereby a first surface of the beamsplitter faces the display and a second surface opposite the first surface faces the reflective surface to reflect light from the reflective surface into a display space, whereby a floating image corresponding to the 2D or 3D image is displayed in the display space;
a second retroreflector with a planar reflective surface oriented to be orthogonal to the reflective surface of the first retroreflector and to face the first surface of the beamsplitter.

23. The display system of claim 22, further comprising a focusing element spaced apart from and parallel to the planar reflective surface of the first retroreflector, whereby the focusing element is positioned between the first retroreflector and the beamsplitter.

24. The display system of claim 22, wherein the display comprises a monitor with a planar display screen arranged parallel to the reflective surface of the retroreflector and wherein the monitor displays the 2D or 3D image at a luminance luminance of at least 2000 Nits.

25. The display system of claim 22, further comprising a controller and a viewer tracking assembly, wherein the viewer tracking assembly tracks at least one of movement of a viewer or location of the viewer relative to the displayed image and wherein the controller controls the display element to modify the 2D or 3D image based on processing of the tracked movement or location of the viewer.

26. The apparatus of claim 25, further comprising a lens element disposed between the reflective surface of the second retroreflector and the first surface of the beamsplitter, wherein the lens element is positioned a distance from the reflective surface of the second retroreflector that is equal to a focal distance of one or more lenses of the lens element.

27. The display system of claim 25, wherein the tracked movement or location viewer involves interaction with the displayed image or a prop positioned proximate to the displayed image.

28. A display apparatus for displaying an image that appears to float in a display space, comprising:
a beamsplitter with a first surface receiving light from a display element, wherein the beamsplitter reflects a first portion of the light and transmits a second portion of the light via a second surface opposite the first surface;
a first retroreflector with a reflective surface facing the display element and the second surface of the beamsplitter receiving and reflecting the second portion of the light from the display element;
a second retroreflector with a reflective surface receiving the first portion of the light reflected from the first surface of the beamsplitter and reflecting the first portion back toward the beamsplitter, wherein the first and second retroreflectors are oriented in the apparatus whereby the first reflective surface is orthogonal to the second reflective surface and wherein the beamsplitter is oriented to place the second surface at a 45 degree angle to the reflective surface of the first retroreflector; and
a controller; and
a viewer tracking assembly, wherein the viewer tracking assembly tracks interaction of the viewer with the displayed image or a prop associated with the displayed image and wherein the controller generates control signals to the display element to modify the 2D or 3D image based on processing of the tracked interaction.

29. The display apparatus of claim 28, wherein the display apparatus includes the display element and wherein the display element comprises at least one of a 2D or 3D object with a 2D or 3D surface providing the light, a multiplane display element, and an LED chase or row.

30. The display apparatus of claim 29, wherein the display element comprises a polarized display and further including an optical stack disposed between the polarized display and the first surface of the beamsplitter, the optical stack including a pair of quarter wave plates, a half mirror sandwiched between the quarter wave plates, and a reflective polarizer between the first surface of the beamsplitter and the quarter wave plates.

\* \* \* \* \*